(12) United States Patent　　(10) Patent No.: US 6,348,974 B1
Takahashi et al.　　(45) Date of Patent: Feb. 19, 2002

(54) COMBINATION TYPE IMAGE FORMING APPARATUS

(75) Inventors: Toshiharu Takahashi; Miki Konno; Masako Shibaki, all of Kawasaki (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/066,843

(22) Filed: Apr. 28, 1998

(30) Foreign Application Priority Data

Apr. 28, 1997 (JP) .............................................. 9-110707

(51) Int. Cl.$^7$ .............................................. G06F 15/00
(52) U.S. Cl. .................... 358/1.16; 358/1.15; 358/1.17; 358/404
(58) Field of Search .............................. 358/1.11, 1.12, 358/1.13, 1.14, 1.15, 1.16, 1.17, 444, 402, 404; 711/111, 112, 117, 134

(56) References Cited

U.S. PATENT DOCUMENTS

| | | | |
|---|---|---|---|
| 5,051,925 A | * 9/1991 | Kadono et al. | 364/519 |
| 5,142,667 A | 8/1992 | Dimperio et al. | 395/1.16 |
| 5,239,388 A | 8/1993 | Matsumoto | 358/448 |
| 5,396,341 A | 3/1995 | Takahashi et al. | 358/400 |
| 5,673,373 A | 9/1997 | Nosaki et al. | 358/1.15 |
| 5,712,713 A | 1/1998 | Hamanaka et al. | 358/451 |
| 5,724,490 A | 3/1998 | Shibaki et al. | 358/1.15 |
| 5,829,044 A | * 10/1998 | Sono | 711/156 |
| 5,893,139 A | * 4/1999 | Kamiyama | 711/117 |
| 5,930,467 A | * 7/1999 | Morita | 358/1.16 |

OTHER PUBLICATIONS

Patent Abstracts of Japan, vol. 096/No. 007, Jul. 31, 1996, Abstract of Mori Akito, "Image Processor", Japanese 08–079418, Mar. 22, 1996.

* cited by examiner

*Primary Examiner*—Mark Wallerson
(74) *Attorney, Agent, or Firm*—Foley & Lardner

(57) ABSTRACT

An image forming apparatus including CPU can eliminate an influence of a difference in access time by selecting a deletion mode of whether the image information of each page is deleted each time when printing of the page of the last copy of an original is finished or the image information of all the pages is in a lump deleted when printing of all the copies of the last copy of the original is finished in a sort mode according to whether or not a hard disk device is mounted when power is applied to the apparatus and enables at least an image information of a page read by a scanner to effectively create a file by generating near memory full in file creation of an image information, by switching possibility levels of concurrent operations of jobs based on the presence or absence of the hard disk device and a capacity of RAM.

38 Claims, 30 Drawing Sheets

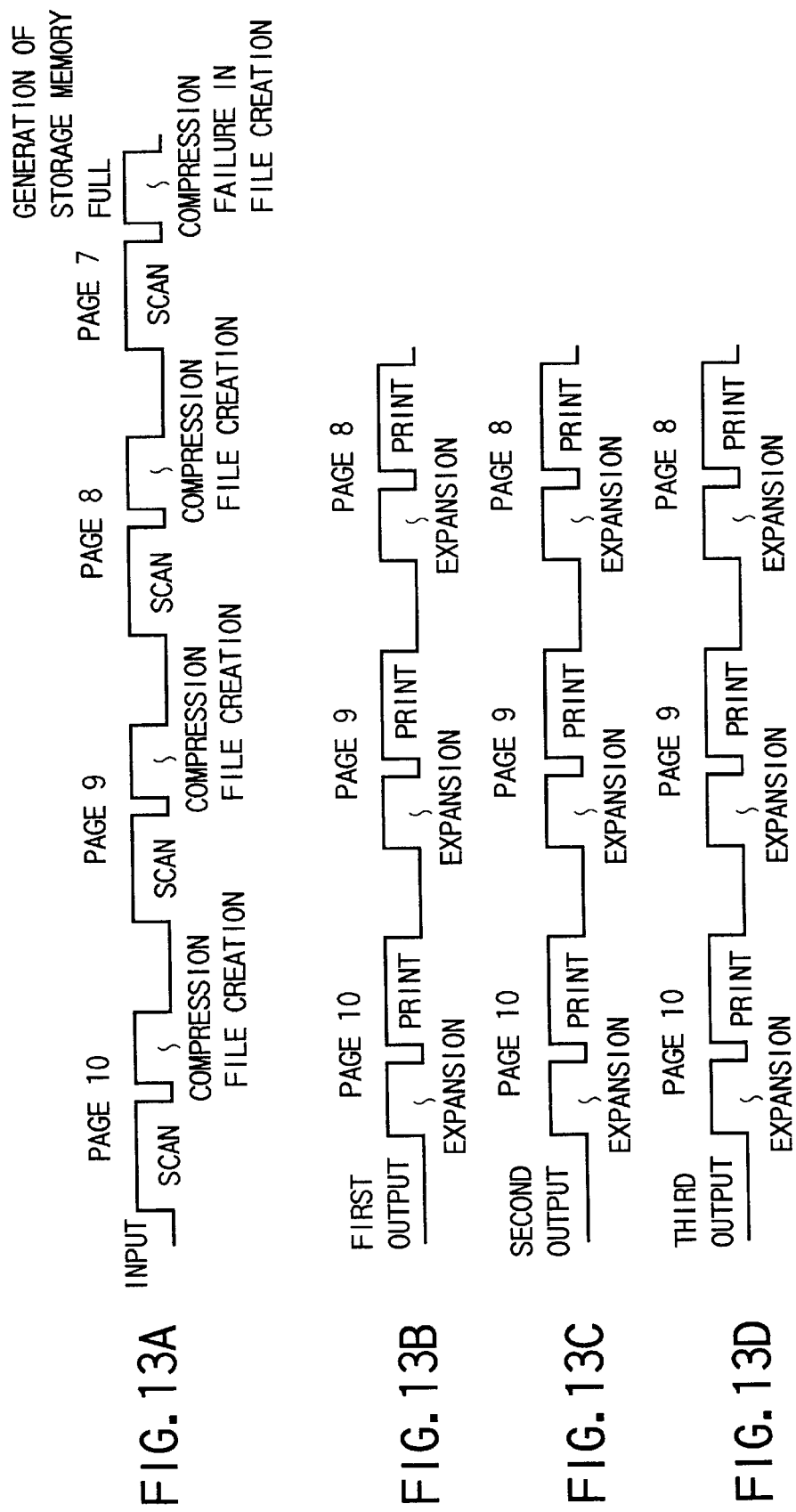

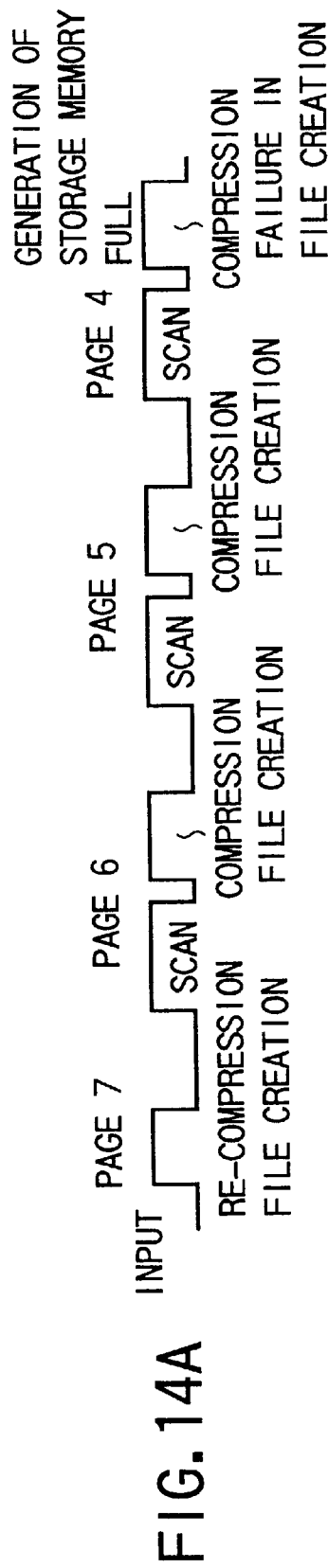
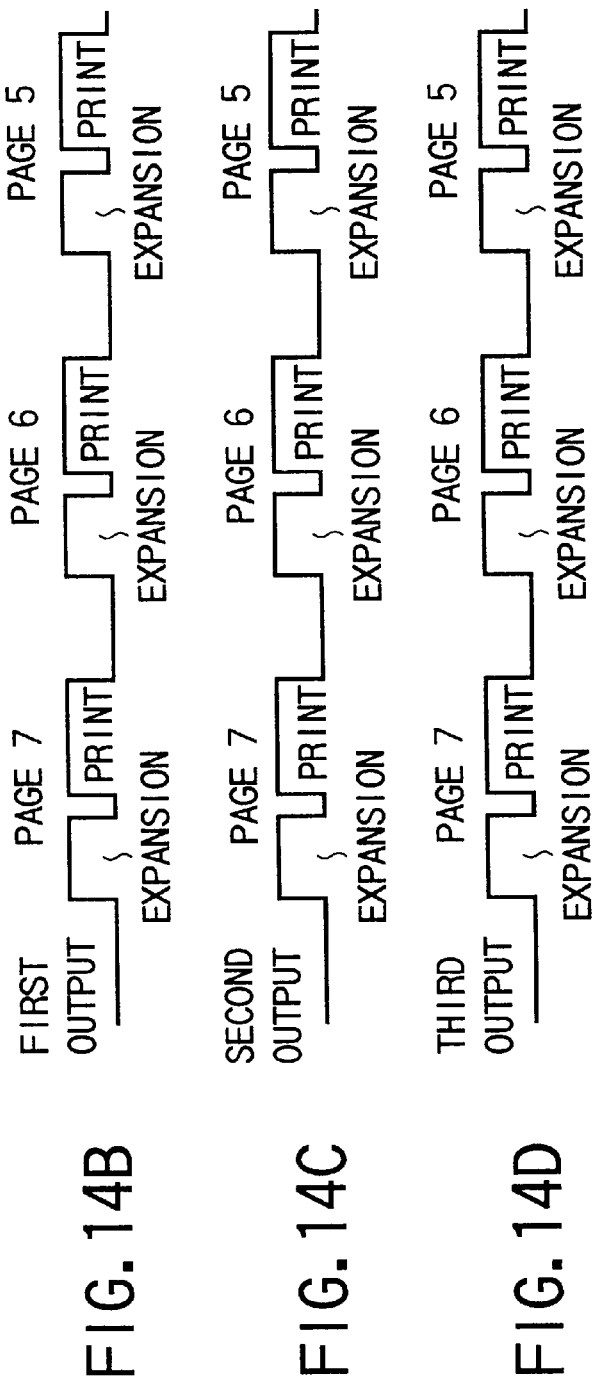
FIG. 14A  FIG. 14B  FIG. 14C  FIG. 14D

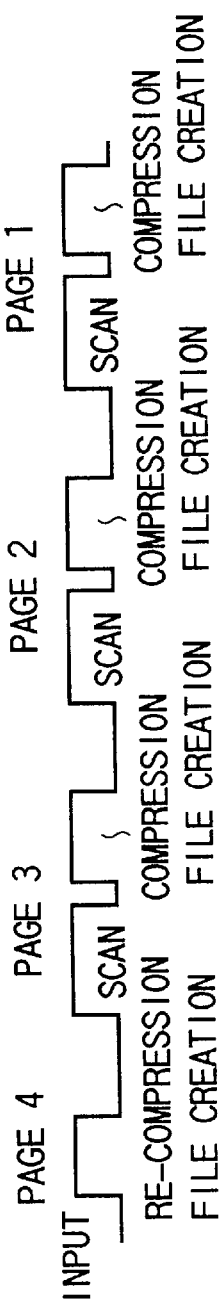
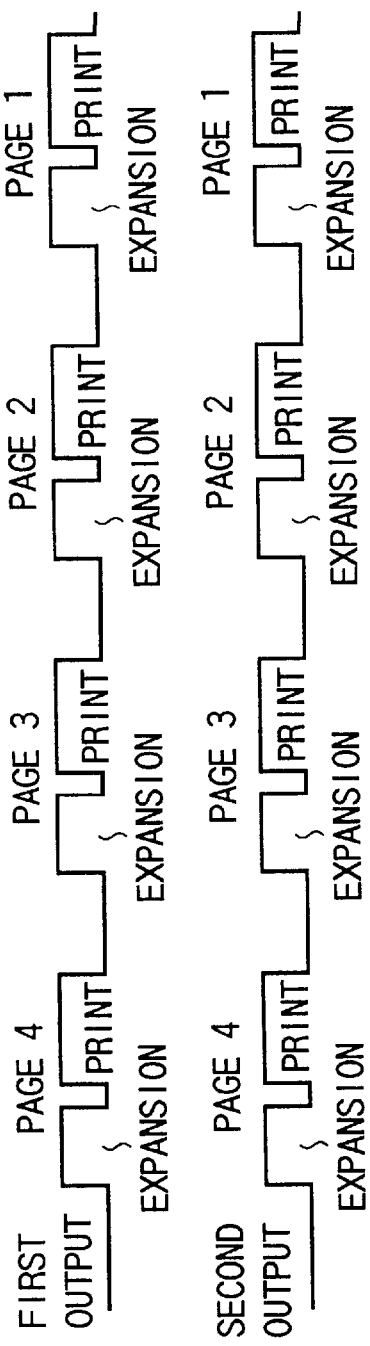
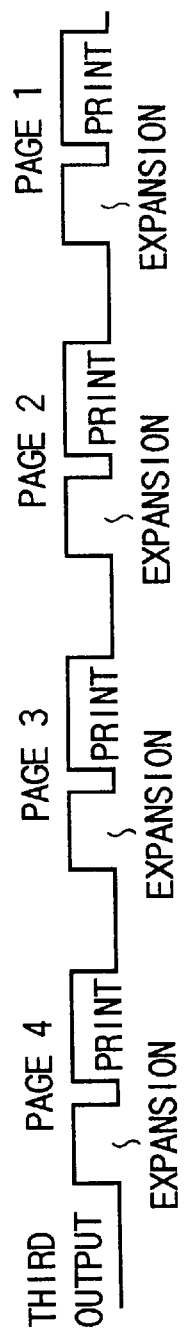
FIG. 15A  FIG. 15B  FIG. 15C  FIG. 15D

| JOB IN RUN \ FOLLOWING JOB | COPY 1 | COPY 2 | FAX INPUT | FAX PRINT | PRINTER | INTERRUPT COPY | FAX MEMORY FULL PRINT |
|---|---|---|---|---|---|---|---|
| COPY 1 | — | — | × | × | × | ○ | ○ |
| COPY 2 | — | — | × | × | × | ○ | ○ |
| FAX INPUT | ○ | ○ | — | — | × | ○ | ○ |
| FAX PRINT | ○ | ○ | ○ | × | × | ○ | — |
| PRINTER | △ | △ | × | × | — | ○ | ○ |
| INTERRUPT COPY | × | × | × | × | × | — | × |
| FAX MEMORY FULL PRINT | × | × | × | — | × | × | — |

FIG. 24

COMBINATION TYPE IMAGE FORMING APPARATUS

BACKGROUND OF THE INVENTION

The present invention relates to an image forming apparatus comprising storage devices used for forming an image, some of which has a large access speed, such as an RAM or the like, and some of which has a large capacity, though with a small access speed, such as a hard disk device.

Conventionally, a digital copying machine has come to be widely used as an image forming apparatus. This image forming apparatus has an electronic sort copying function that an input image read by a scanner, which is an image reading device, is compressed and stored as image information in a page memory provided with a file area partitioned in pages each as a unit and thereafter, this image information is expanded and printed (formation of a visual image on a medium) and a predetermined number of copies of each document are produced, and a group or a stack function that the image information thus expanded is printed on the predetermined number of sheets for each page of the document.

In electronic sort copying, as one method, all the images of documents each comprising a plurality of pages are input from a scanner, the image information is compressed in a page memory to create a file and thereafter, the image information is read out for each document to be printed and the process of read and print is repeated to obtain a predetermined number of the same document.

In the course of creation of a file, a file area in a page memory is in excess of its storage capacity and there is a possibility that memory-full occurs. In such a case, conventionally, an input operation of a page image has been stopped half way and at this point some of image information of a page, which is already read in a scanner, but is still before storing in a file has been deleted and printing (image forming) has to be stopped. Moreover, after the memory-full condition is cleared, deleted image information of a page has to be again read after the original page sheet is again set on the scanner.

It has been well known that such an inconvenience as this occurs in the case where sheet jam occurs or in the case where a demand for execution of interrupt of a different job is accepted in an image copying operation and the image copying operation is restarted after the different job is finished.

As a method to solve such inconveniences, it is conceived that, for example, a hard disk device having a large storage capacity is used to increase a quantity of memory resources and thus a phenomenon of memory-full is prevented from occurring. However, there arises another inconvenience that this hard disk device does not have a large access speed and thereby an image forming operation such as electronic sort copying as a first thing of its kind is slowed down.

When inputting and printing of an image are concurrently operated, expansion and printing of the stored image information are operated after scanning of page images, compression and file creation are finished, so that a user has to wait for a while till printing of a first page is printed in a normal condition or after an discontinuance by a job interrupt or jam, but in a general copying operation, it is desirable that a printing result is output immediately after a user starts the operation.

As described above, a conventional image forming apparatus comprising storage devices used for forming an image, some of which has a large access speed, such as an RAM or the like, and some of which has a large capacity, though with a small access speed, such as a hard disk device, has a problem that a processing speed is slowed down, even if a storage capacity is increased by use of the hard disk device; since an input operation is suspended half way and an image information which has been read is deleted when a memory-full phenomenon or sheet jam occurs, or a job interrupt is demanded, there is another problem that operability is degraded; and besides, there are other various problems such as when inputting and printing of an image are concurrently operated, a user has to wait for a while till a first page is printed in a normal condition or after discontinuance by a job interrupt or jam.

It is, accordingly, an object of the present invention to provide an image forming apparatus in which a processing speed is not reduced even when a storage capacity is increased by use of a large capacity storage device such as a hard disk device or the like, image information which has already been read is not deleted even when memory-full or sheet jam occurs or a different job interrupts in the course of image inputting, a user does not have to wait for a start of printing of a first page in a normal condition or after discontinuance by a job interrupt or jam when inputting and printing of images are concurrently operated, and the image forming with a large operating speed and excellent operability can be achieved.

BRIEF SUMMARY OF THE INVENTION

An image forming apparatus of the present invention comprises: read means for reading image information of an original; storage means for storing the image information read in the read means; deciding means for deciding on whether an access speed of the storage means is small or large; setting means for setting a first image forming mode if the access speed of the storage means is small, or setting a second image forming mode if the access speed of the storage means is large, based on decision of the deciding means; selecting means for selecting one of the first and second image forming modes set by the setting means according to the decision made by the deciding means; and image forming means for forming an image on an image forming medium from the image information stored in the storage means in a selected image forming mode according to an output of the selecting means, wherein the image forming means comprises deleting means for deleting page image information from the storage means each time when a page image is formed, if the first image forming mode is selected.

An image forming apparatus of the present invention comprises: read means for reading image information of an original; storage means for storing the image information read by the read means; generating means for generating a signal showing whether the storage means has a large access speed or a small access speed; setting means for setting an image forming condition including a first sort mode if the access speed of the storage means is small, or a second sort mode if the access speed of the storage means is large, as a sort mode in which binding is carried out for each copy of the original in forming an image on an image forming medium from the image information stored in the storage means; selecting means for selecting one of the first and second sort modes set in the setting means according to an output signal of the generating means; and image forming means for forming an image on the image forming medium from the image information stored in the storage means based on the image forming condition including a sort mode selected according to an output of the selecting means.

An image forming apparatus of the present invention comprises: read means for reading image information of an original; storage means for storing the image information read by the read means; generating means for generating a signal showing whether the storage means has a large access speed or a small one; setting means for setting an image forming condition including a first sort mode if the access speed of the storage means is small, or a second sort mode if the access speed of the storage means is large, as a sort mode in which binding is carried out for each copy of the original in forming an image on an image forming medium from the image information stored in the storage means; selecting means for selecting one of the first and second sort modes as a running state of an image forming condition set by the setting means according to an output of the generating means; and image forming means for forming an image on the image forming medium from the image information stored in the storage means based on the image forming condition including a sort mode selected according to an output of the selecting means.

An image forming apparatus of the present invention comprises: read means for reading image information of an original; storage means for storing the image information read by the read means; setting means for setting execution of image forming in either a group mode in which formation of an image on an image forming medium from the image information stored in the storage means is conducted so as to produce a predetermined number of copies for each page of the original or a sort mode in which formation of an image on an image forming medium from the image information stored in the storage means is conducted so as to carry out binding for each copy of the original; first selecting means for selecting, as a running state of image formation set in the setting mode, either the group mode or the sort mode; second selecting means for selecting as a running state of the selected group mode according to an output of the first selecting means either a first deletion mode in which the image information of each original page is deleted from the storage means each time when image formation of the predetermined number of copies for the original page is finished or a second deletion mode in which the image information of all the original pages is in a lump is deleted from the storage means when image formation of the predetermined number of copies respectively for all the pages is finished; and deletion means for effecting the deletion in a lump after the image formation is executed in the sort mode if the second deletion mode is selected.

An image forming apparatus of the present invention comprises: read means for reading image information of an original; storage means for storing the image information read by the read means; generating means for generating a type signal showing whether the storage means is of a first type which has a small storage capacity or of a second type which has a large capacity; first detecting means for detecting that an unused area of the storage means is equal to or less than a first threshold value if the storage means is of the first type based on the type signal; second detecting means for detecting that an unused area of the storage means is equal to or less than a second threshold value larger than the first threshold value if the storage means is of the second type based on the type signal; effecting means for effecting a memory-full operation on the storage means according to an detection signal from the first or second detecting means; and image forming means for forming an image on an image forming medium from the image information stored in the storage means.

An image forming apparatus of the present invention comprises: read means for reading image information of an original; compressing means for compressing the read image information; storage means for storing the compressed image information in a file; effecting means for effecting a memory-full operation when a residual storage capacity of the storage means is at least equal to or less than a threshold value at which the image information, in which a page image of the maximum size readable by the read means is compressed in a file, can be stored; effecting means for effecting the memory full-operation on the storage means when the memory full occurs; executing means for executing a read operation of the original, and compression of and file creation for the read image information if the original is set on the read means when the memory-full operation is effected; and image forming means for forming an image on an image forming medium based on the image information stored in a file in the storage means.

An image forming apparatus of the present invention comprises: read means for reading image information of an original; storage means for storing the image information read by the read means; first detecting means for detecting whether or not a first storage device which has a large capacity and a small access speed as a storage means is included; second detecting means for detecting whether or not a second storage device which has a large access speed and a storage capacity equal to or more than a predetermined value is included; and control means comprising a concurrent operation control table for controlling switching between a job in run and a following job and contents of the concurrent operations based on detection results of the first and second detecting means; running means for running a predetermined job under control by the control means.

An image forming apparatus of the present invention comprises: read means for reading image information of an original; storage means for storing the image information read by the read means; detecting means for detecting the provision of a large capacity storage apparatus which has a small access speed as the storage means; setting means for setting self-diagnostic mode of the large capacity storage device when power is applied; securing means for securing a volume of a predetermined quantity in the interior of the large capacity storage device if a specific command is given in a condition set in self-diagnostic mode; volume storage means for storing the image information in the volume; and image forming means for forming an image on the image forming medium based on the image information stored in the volume under a predetermined image forming condition.

An image forming apparatus of the present invention comprises: read means for reading image information of an original; storage means for storing the image information read by the read means; first file creating means for creating a file in a compressed condition for the image information stored in the storage means; second file creating means for creating a file for the image information stored in the storage means in a condition of being compressed and rotated by 90 degrees; third file creating means for creating a file for the image information stored in the storage means in a condition of being compressed and rotated by 180 degrees; fourth file creating means for creating a file for the image information stored in the storage means in a condition of being compressed and rotated by 270 degrees; and image forming means for forming an image on the image forming medium based on the image information stored in a file under a predetermined image forming condition.

An image forming apparatus of the present invention comprises: read means for reading image information of an original; storage means for storing the image information read by the read means; deciding means for deciding whether an access speed of the storage means is small or large; setting means for setting a first image forming mode if the storage means has a small access speed, or setting a second image forming mode if the storage means has a large access speed based on the deciding means; selecting means for selecting one of the first and second image forming modes according to a decision made by the deciding means; image forming means for forming an image on the image forming medium based on the stored image information in the storage means in an image forming mode selected according to an output of the selecting means, wherein the image forming means comprises executing means for storing the image information of the original in the storage means after reading the image information by the read means and concurrently executing image formation of a first page in a normal condition or at restart after discontinuance of an operation.

With the above mentioned constitutions, there can be provided an image forming apparatus in which a processing speed is not reduced even when a storage capacity is increased by use of a large capacity storage device such as a hard disk device or the like, image information which has already been read is not deleted even when memory-full or sheet jam occurs or a different job interrupts is present in the course of image inputting, a user does not have to wait for a while start of printing of a first page in a normal condition or after discontinuance by a job interrupt or jam when inputting and printing of images are concurrently operated, and image forming with a large operating speed and excellent operability can be achieved.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 13A to 13D show, in combination, a timing chart of an original input and print output when memory-full occurs in outputting in a staple mode;

FIGS. 14A to 14D show, in combination, a timing chart of an original input and print output when memory-full occurs in outputting in a staple mode;

FIGS. 15A to 15D show, in combination, a timing chart of an original input and print output when being output in staple sort mode;

FIG. 24 shows a constitution of a control table of concurrent operations;

DETAILED DESCRIPTION OF THE INVENTION

An embodiment of the present invention will be described in reference to the accompanying drawings. In the following embodiments, a hard disk device is used as large capacity storage device, but a digital video disk, an optical disk an the like can also be used as a large capacity non-volatile storage device.

Figure 1:
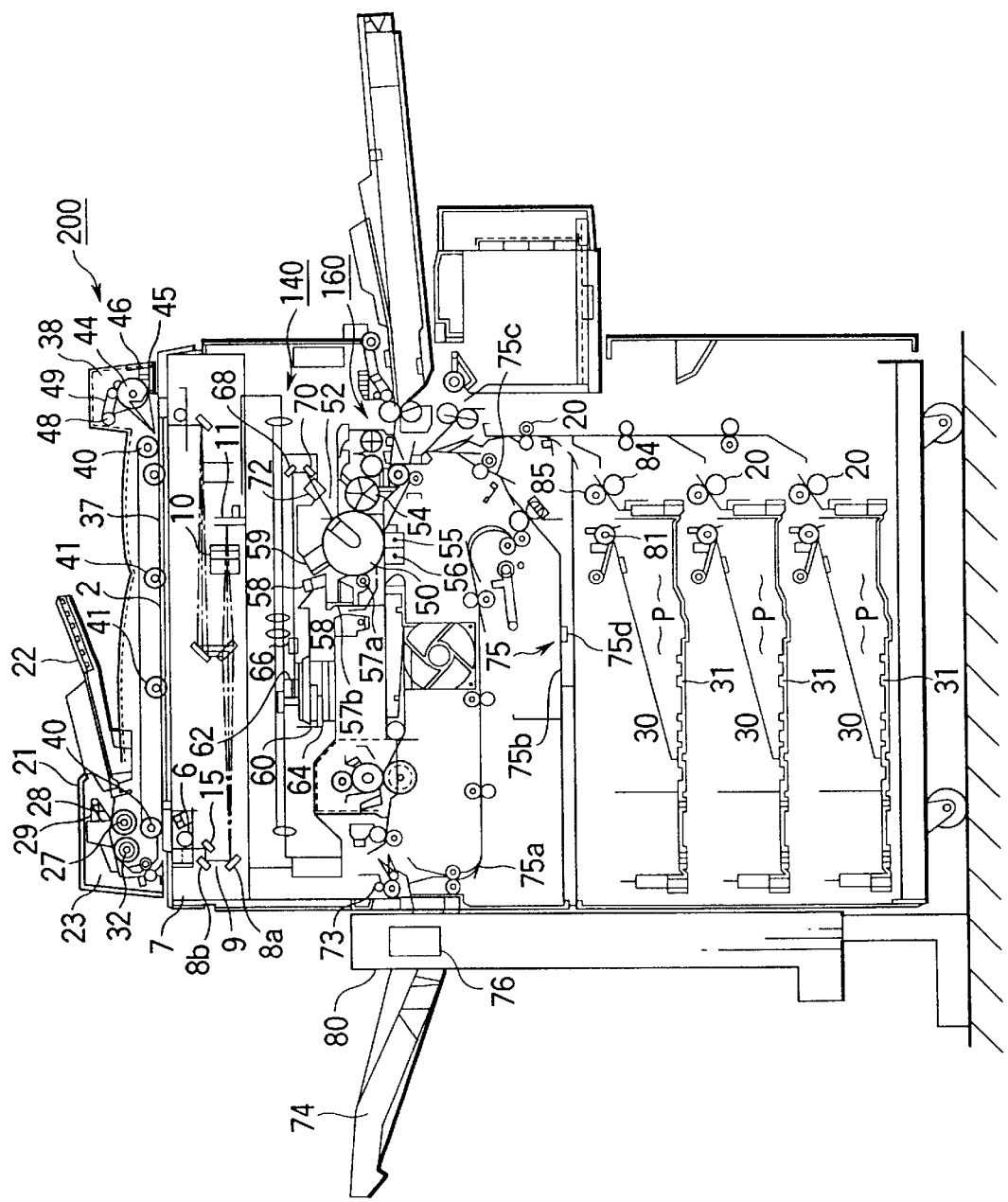
FIG. 1 is a schematic sectional view showing a structure of an image forming apparatus according an embodiment of the present invention.

FIG. 1 is a view schematically showing an overall structure of an electronic digital copy machine as an image forming apparatus according to the embodiment. This apparatus comprises: an original scanning section 140 in which an original is optically scanned and reflecting light is subjected to photoelectric conversion to attain image data or image information; an image forming section 160 for forming an image on a medium based on the image data; and an automatic document feeder device (ADF) 200 for feeding an original or document in the top portion.

A rear end of a cover body 21 as a box of the automatic document feeder device 200 is mounted to a rear end of the top surface of the apparatus body with a hinge, not shown, lying therebetween so that the device 200 can freely be opened or closed and the whole of the automatic document feeder device 200 can be, if necessary, opened so that an original table is exposed by rotating.

An original feed table 22 which makes it possible to hold a plurality of sheets of an original as a whole is provided at a position above the left portion of the cover body 21. There is provided at one end side of the device 200 a feed device 23 in which sheets of the original are taken out one by one and each sheet is fed the one end side of the original table 2 (the left hand side in the figure as viewed). The feed device 23 comprises: a pick-up roller 27 which is used for taking out an original one by one; a weight plate 28 pressing a sheet of the original to the pick-up roller 27; an empty sensor for detecting a setting state of an original sheet on the original feed table 22 as an original detecting sensor; and like.

A feed roller 32 is disposed in a take-out direction of an original sheet of the pick-up roller 27, so that it is assured that the original is fed one by one. An original conveyer belt 37 is extended above the original table 2 in a covering manner. The original conveyer belt 37 is a wide, endless belt with a color of white on its outer surface, which is extended between a pair of belt rollers 40, 40, and can respectively run in opposed directions, positive or negative by a belt drive mechanism (not shown).

There are provided on the rear side of the original conveyer or transporting belt 37 a plurality of rollers 41 for pushing a belt (only three rollers 41 are shown in the figure) onto the original table 2 at its belt surface and further a set switch (not shown) for detecting an open or close condition of the automatic document feeder device 200.

An original transported by the feed device 23 is transported from one end side of the original table 2 (the left hand side as viewed) to the other end side (the right hand side as viewed). A take-out device 38 is provided in the right hand side of the device 200. The take-out device 38 comprises: a transport roller 44; a pinch roller 45 for pressing a sheet of an original to the transport roller 44; a take-out sensor 46 as an original detecting means for detecting a following end, in a take-out direction, of the sheet of an original; and the like.

A take-out roller 48 is disposed at the downstream side of an original take-out route. There is disposed in the original take-out route a gate 49 for guiding the original sheet, upside down, to the original table 2, which enables double-sided copying on a sheet.

An original scanning section 140 comprises: an exposure lamp 6 as a light source, a first carriage 7 with a mirror 15 mounted thereto; a second carriage 9 with mirrors 8a, 8b mounted thereto which bend an optical path; a lens 10; a photoelectric converter 11 receiving reflected light from an original sheet; a driver system (not shown) for changing positions of parts; and an A/D converter (not shown) in which an analogue image information is converted to a digital information.

The first and second carriages 7, 9 are connected to each other by a timing belt (not shown) and the second carriage 9 is set to travel at a speed half as large as the first carriage 7 in the same direction. Thereby the lens 10 can scan with a constant optical path length to the lens 10. The lens 10 is of a fixed focal length and is moved along an optical axis when a variable magnifying power other than 1 is adopted in copying.

The photoelectric converter 11 is to cause reflected light from an original sheet to be converted to electric energy and constructed by a line image sensor of a CCD type, for example, as a main part. In this case, one pixel of the original corresponds to one element of the CCD sensor. An output of the photoelectric converter 11 is supplied to the A/D converter 176.

Movements of the first and second carriages 7, 9 and the mirrors 12a, 12b are respectively performed by stepping motors (not shown). The first and second carriages 7, 9 are moved in correspondence with actions (not shown) of the timing belt extended between a drive pulley (not shown) which are connected to the rotary shaft of a stepping motor and an idle pulley (not shown). The lens 10 is moved along the optical axis by a movement of a spiral on a spiral shaft (not shown) by a corresponding stepping motor (not shown).

The photoelectric converter 60 comprises a semiconductor laser and further comprises: a collimator lens 62; a polygon mirror (multi-faced reflecting mirror) 64, a lens 66, reflecting mirrors 68, 70; a lens 72, which are disposed in an opposing manner to the photoelectric converter 60, and laser light from an exposure apparatus 52 is irradiated on a photosensitive material drum 50.

The image forming section 160 comprises: a laser optical system and an electrophotographic system in which a visual image formation on a transfer paper sheet of an image forming medium. That is, the image forming section 160 comprises: the photosensitive material drum 50, which carries an image, supported by a shaft in a freely rotating manner and located at almost the center of the apparatus; and the exposure apparatus 52; a developing apparatus 54; a transfer charger 55; a separating charger 56; a cleaning charger; an electric discharging charger 58; and an electric charge applying charger 59, which are disposed around the photosensitive material drum 50 in the order along a circumferential direction.

The photosensitive material drum 50 is designed to be charged in a uniform manner by the electric charge applying charger 59 and at the same time laser light projected from the original scanning section 140 to the surface of the original sheet is guided onto the photosensitive material drum 50 to form an image of the original on the surface thereof and thereby an electrostatic latent image corresponding to the original image is formed.

The electrostatic latent image formed on the photosensitive material drum 50 is transformed to a toner visual image through developing by the developing device 54 and the toner image is then transferred onto a copy paper sheet P, which is transported through a register roller 20 from the feed cassette 30 as feed means later described, by a transfer charger 55.

The copy paper sheet P after the image transfer by the transfer charger 55 is then separated from the photosensitive material drum 50 by the separation charger 56 using an AC corona discharge and transported to the fixing device 72 with the help of a transport belt and the toner developing image is fixed through melting by the fixing device 72.

Thereafter, the copy paper sheet P is taken out on a take-out tray 74 through a sorter 80 from a take-out roller 73. In the sorter 80, a stapler 76 is provided in order to bind each copy set of take-out copy paper sheets with a staple in a sort mode. The take-out tray 74 is shiftable in a directions, forward or backward, or to the left or to the right, by a tray driver later described in order to adjust a loading position of a take-out sheet.

On the other hand, a residual charged toner developer on the photosensitive material drum 50 after transfer/separation of the toner developing image to the copy paper sheet P is subjected to discharge by the electric discharging charger 57a before cleaning, thereafter scratched away by a cleaning blade 57b, furthermore, a potential on the photosensitive material drum 50 is lowered to a predetermined value by the electric discharge lamp 58 and a following copy operation is thus made possible.

In the case where both sides of a copy sheet P is printed, copy sheets P are accumulated in a tray 75b after the copy sheets P, on one side of which a toner developing image has been fixed through melting by the fixing device 72 described above, are transported through a transport route 75a. Copy sheets, on one side of each of which is already printed, and which are accumulated in the tray 75b, are transported to the transfer charger 55 through the transport route 75c and the toner-developed image is transferred onto the other side which is not printed. A paper sensor 75d of a light reflecting type is provided at the lower part of the tray 75b and it is detected whether or not paper sheets loaded on the tray 75b are present.

The transport route 75a, the tray 75b, the transport route 75c and the sheet sensor 75d are constituents of an automatic double-side device (ADD) 75 as an automatic double side inversion mechanism.

In the figure, 30 indicates feed cassettes as feed means, one on another, mounted in a plurality of levels in a freely mountable/dismountable manner from the front side of the apparatus body 1. The feed cassette 30 comprises cassette cases 31 which are boxes in which copy paper sheets P are placed and the take-out end of a cassette case 31 is inclined in the take-out direction.

Copy sheets P in a cassette case 31 in a feed cassette 30 are picked up by a pick-up roller 81 from the uppermost layer of the stack of the copy sheets P. Copy sheets which are taken out as a bundle by the pick-up roller 81 to the take-out side portion of the cassette case 31 are separated to independent sheets in a sheet separating section comprising a feed roller 84 and a separation roller (or a separation pad) 85, which are disposed in the upper inside of the take-out end portion of the cassette case 31 and one copy sheet at one time is transported toward the image forming section 160.

Figure 2:
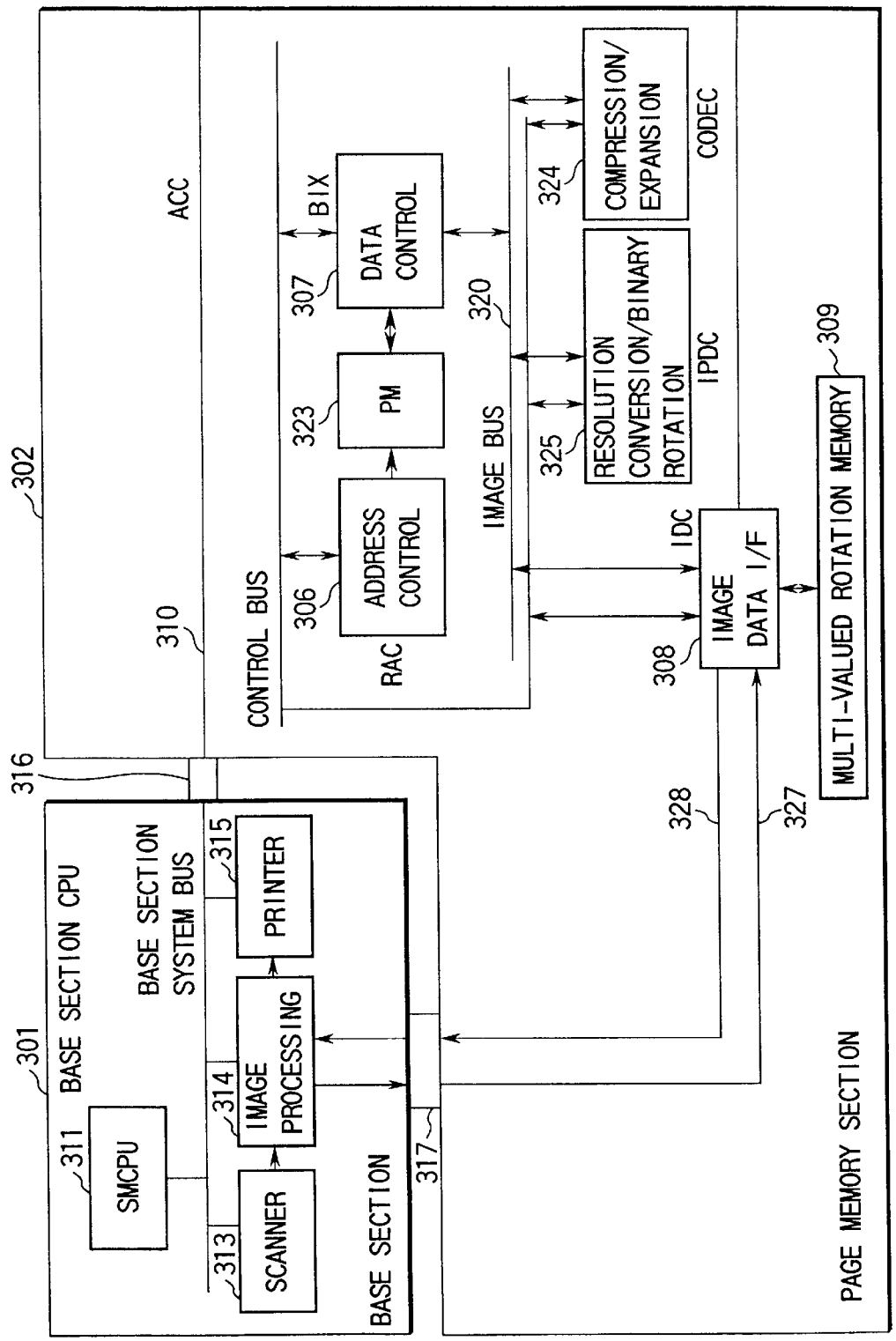
FIG. 2 is a block diagram showing a system constitution of the image forming apparatus shown in FIG. 1.
Figure 3:
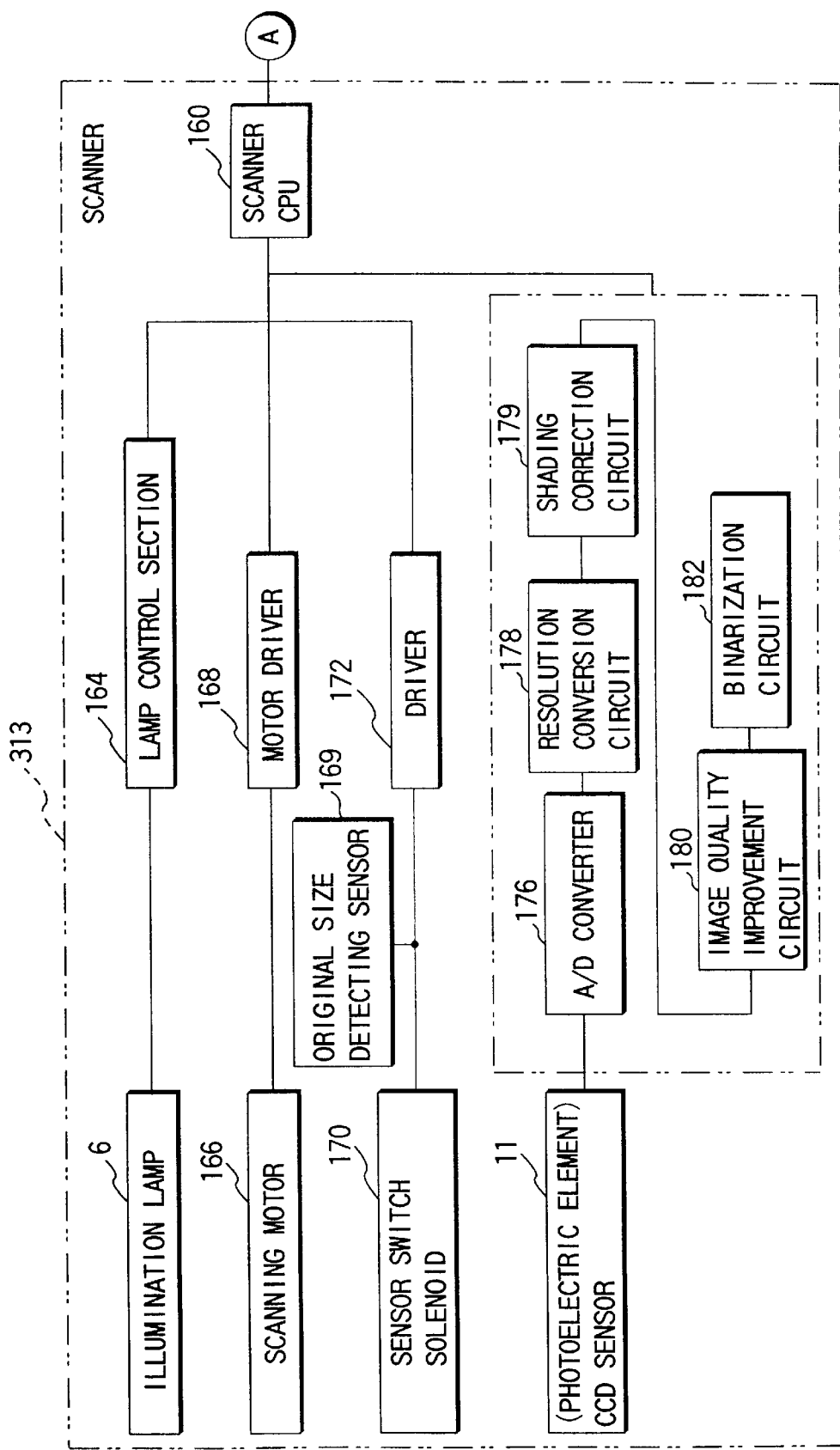
FIG. 3 is a block diagram showing a constitution of a scanner shown in FIG. 2.
Figure 4:
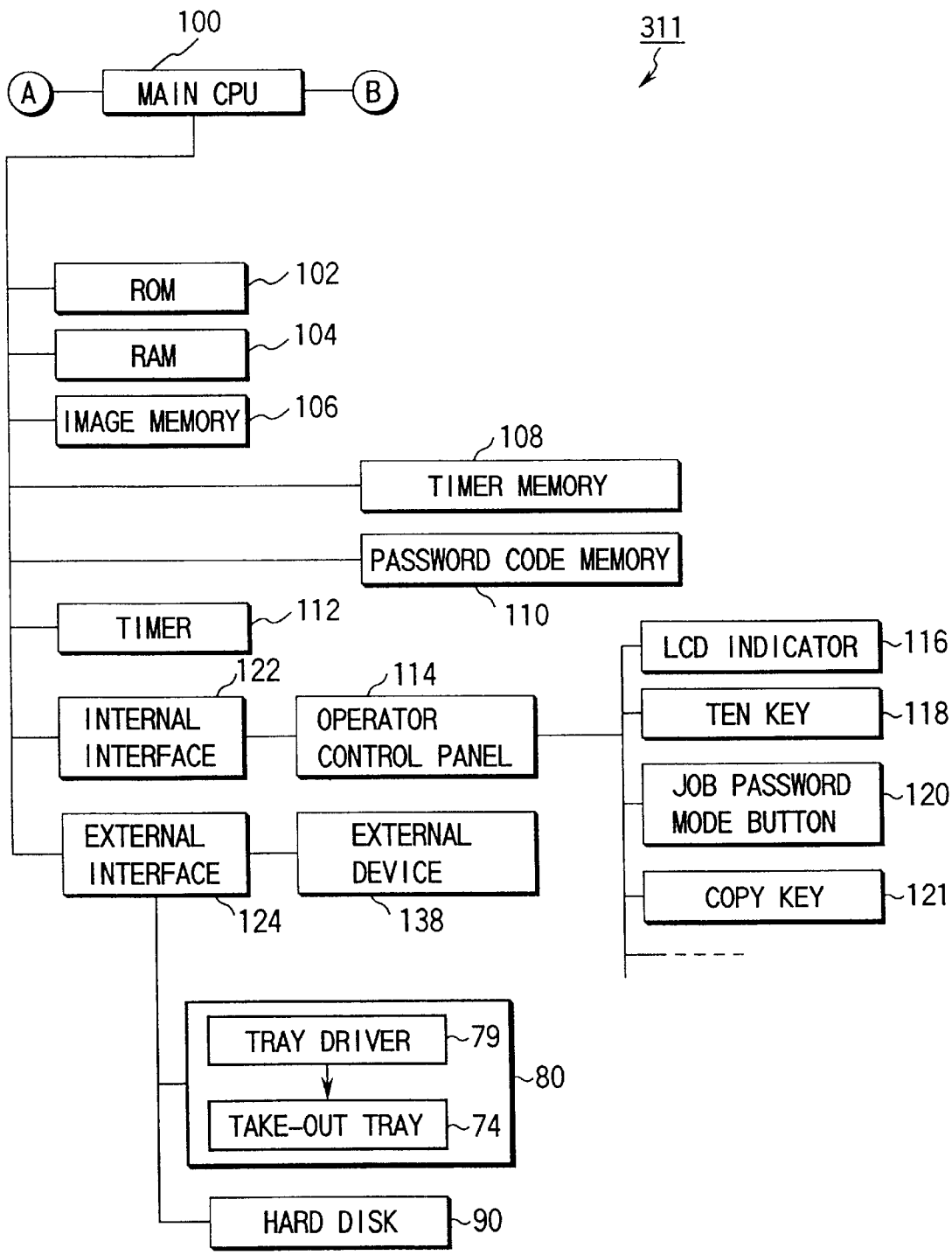
FIG. 4 is a block diagram showing a constitution of a basic CPU of FIG. 2.
Figure 5:
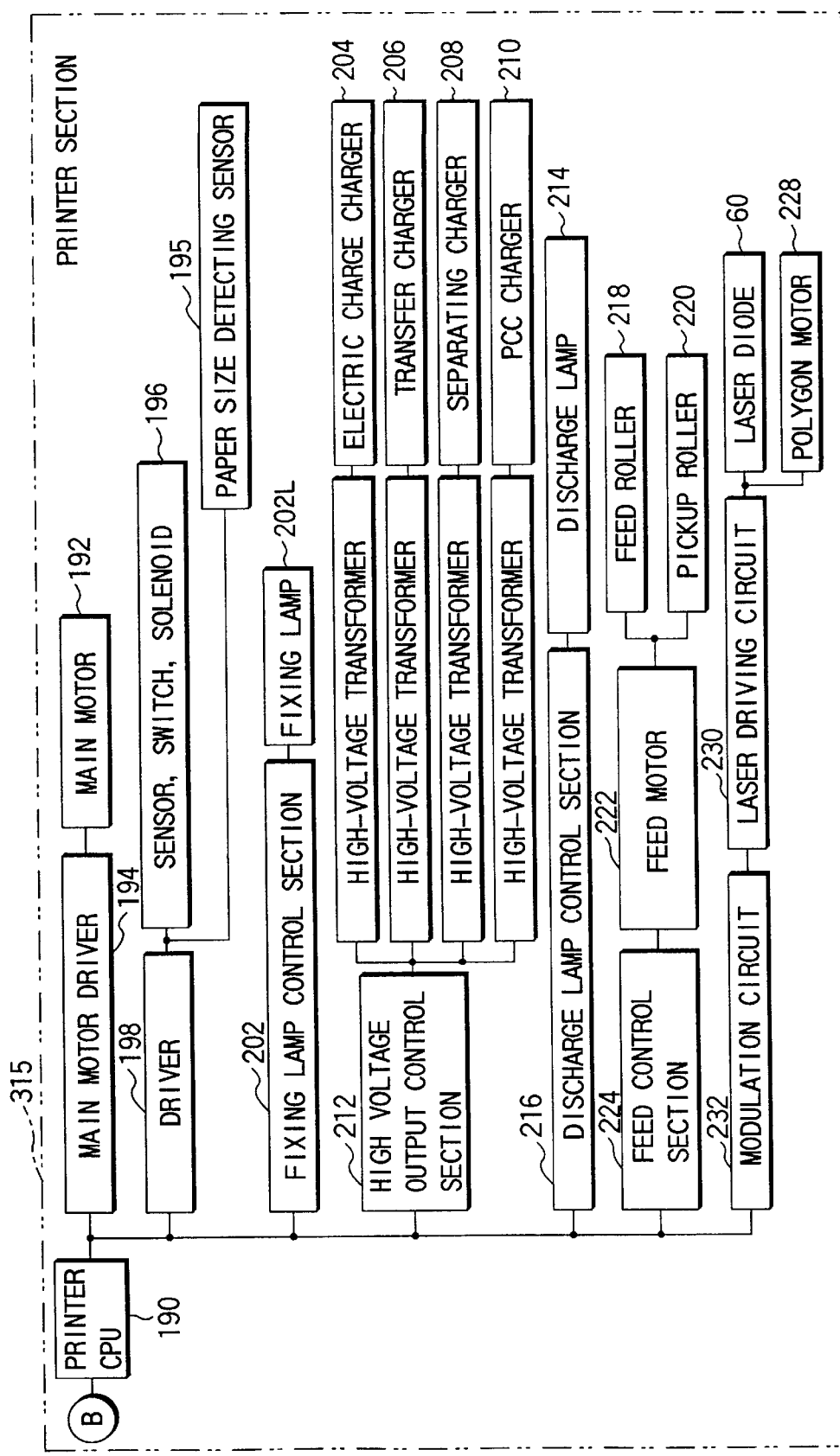
FIG. 5 is a block diagram showing a constitution of a printer section of FIG. 2.
Figure 6:
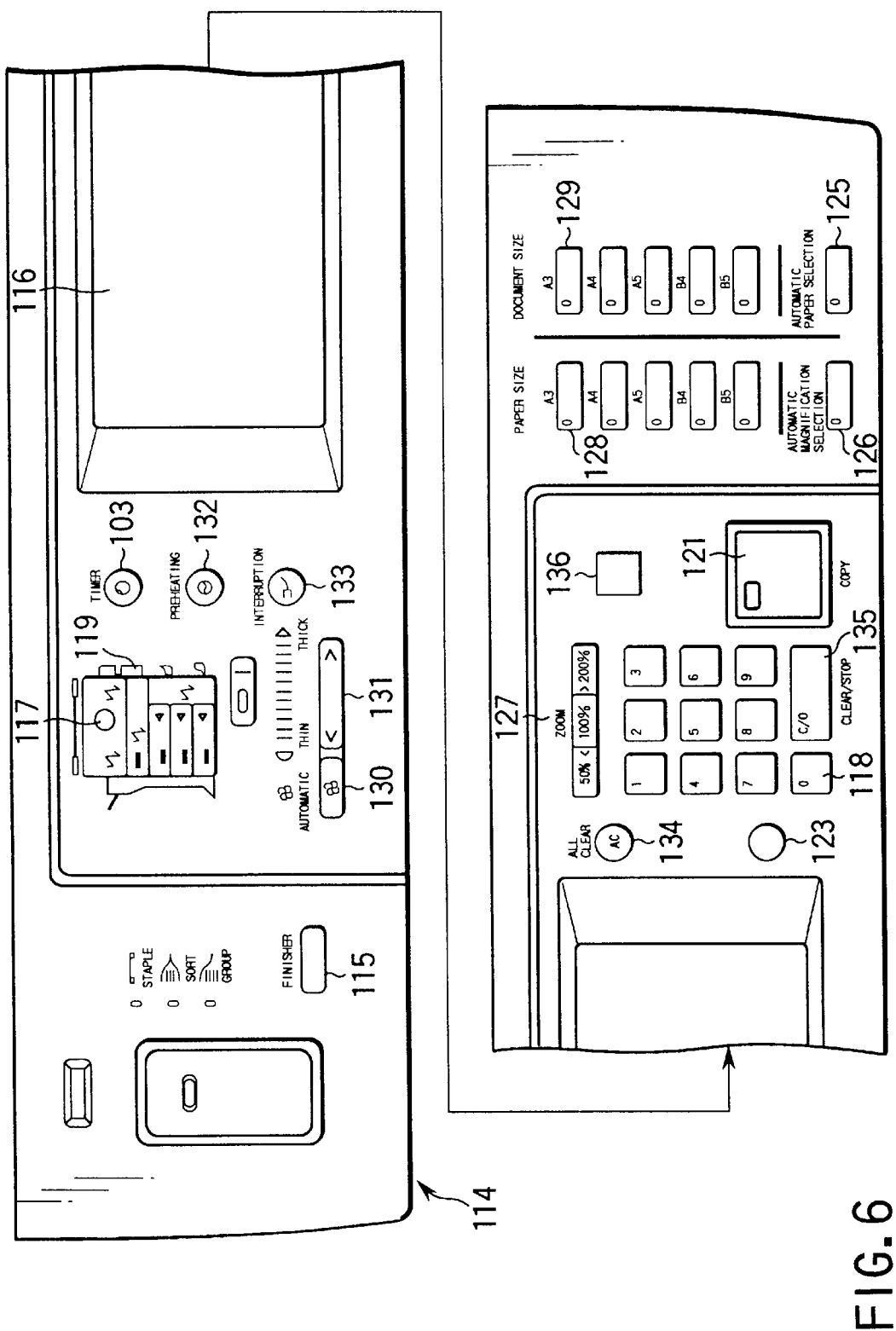
FIG. 6 is a plan view of a configuration of an operator control panel of FIG. 4.

Then a control circuit of a digital copying machine, which is an image forming apparatus of this embodiment will be described in reference to FIGS. 2 to 5. FIG. 2 is a block diagram showing a control system of the digital copying machine, FIG. 3 is a block diagram showing a constitution of a scanner section shown in FIG. 2, FIG. 4 is a block diagram showing a constitution of a CPU of FIG. 2, FIG. 5 is a block diagram showing a constitution of a printer section and FIG. 6 is a plan view showing positional relations of constituents of an operator control panel 4.

In FIG. 2, a control system of the digital copying machine is divided to two major blocks in a broad sense, one of which is a base section 301 constituting a digital copying machine, comprising: a scanner 313 and a printer 315, which are connected by a image processing section 314; the other of which is a page memory section 302 realizing a memory copy by receiving an image information or data from the base section 301 to store and again transferring the stored image information back to the base section 301.

The base section 301 and page memory section 302 are connected by a system interface 316 which sends and receives control information and a base section image interface 317 which sends and receives image information.

The base section 301 comprises: the scanner 313 which is image information input means; a printer 315 which is image information output means; the image processing section 314; and a base section CPU 311.

A main CPU 100 of the base section CPU 311 is connected, as shown in FIG. 4, to ROM 102, RAM 104, an image memory 106, a timer memory 108, password code memory 110, timer 112, internal interface 122; and external interface 124.

The internal interface 122 is connected to an operator console or control panel 114 shown in FIG. 6. There are provided on the operator console panel 114: a finisher key 115; status indicator 117; feed cassette selection key 119 as means for selecting a feed cassette 30; HELP key 123; automatic paper selection key 125; automatic magnification selection key 126; zoom/100% key 127; original size key 128; paper size key 129; LCD indicator 116 for display of a message; automatic density key 130; manual density key 131; preheat key 132; interrupt key 133; all clear key 134; clear/stop key 135; start key 121; timer key 136; ten key 118; and function switch key 136.

The external interface 124 is connected to a sorter 80, an external device such as a personal computer and a hard disk device 90. The take-out tray 74 in the sorter 80 is driven by the tray driver 79.

Storage, reading and the like of image information are carried out by the main CPU 100. For example, when a password code and image information are stored in one set, image information read by a scanner section 313 under control of a scanner CPU 160 is stored in an image memory 106 by a command of the main CPU 100. A command of the main CPU 100 is performed according to a mode determined by an input from the operator control panel 114 (the ten key 118).

Then, referring to FIG. 3, a detailed constitution of the scanner section 313 will be described. The scanner CPU 160 of the scanner section 313 is connected, for the purpose of controlling, with a lamp control section 164 controlling an illumination lamp 6, motor driver 168 controlling a scanning motor 166, a sensor including an original size detecting sensor 169 and a driver 172 in a controlling fashion driving a switch and solenoids 170. Besides, the scanner CPU 160 is further connected for the purpose to control to an A/D conversion circuit 176 for image processing of image information from a photoelectric element, resolution conversion circuit 178, shading correction circuit 179, image quality improvement circuit 180 and binary circuit 182.

Then, the printer section 315 will be described in reference to FIG. 5 in a detailed manner. In the printer section 315, a printer CPU 190 is connected, for the purpose to control, to main motor driver 194 for driving a main motor 192, sensor including a paper size detecting sensor 195, a driver 198 driving in a controlling manner switch and solenoids 196, fixing lamp control section 202 for controlling a fixing lamp 202L, electric charger 204, transfer charger 206, separating charger 208, high voltage output control section 212 for controlling a PCC charger 210, discharge lamp control section 216 for controlling a discharge lamp 214, feed roller 218, feed control section 224 for controlling a feed motor 222 for a pick-up roller 220, a laser diode 60 which is a photoelectric conversion section and a modulation circuit 232 for controlling a laser driving circuit 230 for a polygon motor 228.

The page memory section 302 will be described in reference to FIG. 2. The page memory section 302 is connected to a page memory 323 as storage means for temporarily storing image information, address control section for generating an address in the page memory 323, image bus 320 through which information between respective devices in the page memory section 302 are transferred, information control means 307 for controlling information transfer when information transfer is effected between the page memory 323 and other devices such as the hard disk device 90 through the image bus 320, image information I/F means 308 for interfacing the image information when the image information is transferred to the base section through the base section image interface 317, resolution conversion/binary rotation means 325 for converting image information to a resolution of a different device when the image information is transmitted to the different device, for converting image information received from a different device with a different resolution to a resolution of the printer 315 of the base section 301 and for executing a 90-degree rotation processing of binary image information; compression/expansion means 324 for transmitting compressed image information such as facsimile transmission and optical disk storage, for compressing image information input in a device for storage and for expanding image information in a compressed form in order to visualize through the printer 315; and multi-valued rotation memory 309 for use in outputting the image information rotated by 90 or −90 degrees when image information is output from the printer 315 in connection with the image information I/F means 308.

As the page memory 323, RAM having a capacity of 12 megabytes is provided as a fixed memory on a board and an extended memory as an option is mountable. As this extended memory, for example, two RAM boards of 8 megabytes, that is 16 megabytes in total, can be added in SIMM.

In the present invention, possibility levels of job concurrent operations can be switched in various ways, as described later, according to a mounted quantity of a memory capacity as RAM and a method of detecting a mounted quantity of RAM by SMCPU will be described in reference to FIG. 34.

Figure 34:
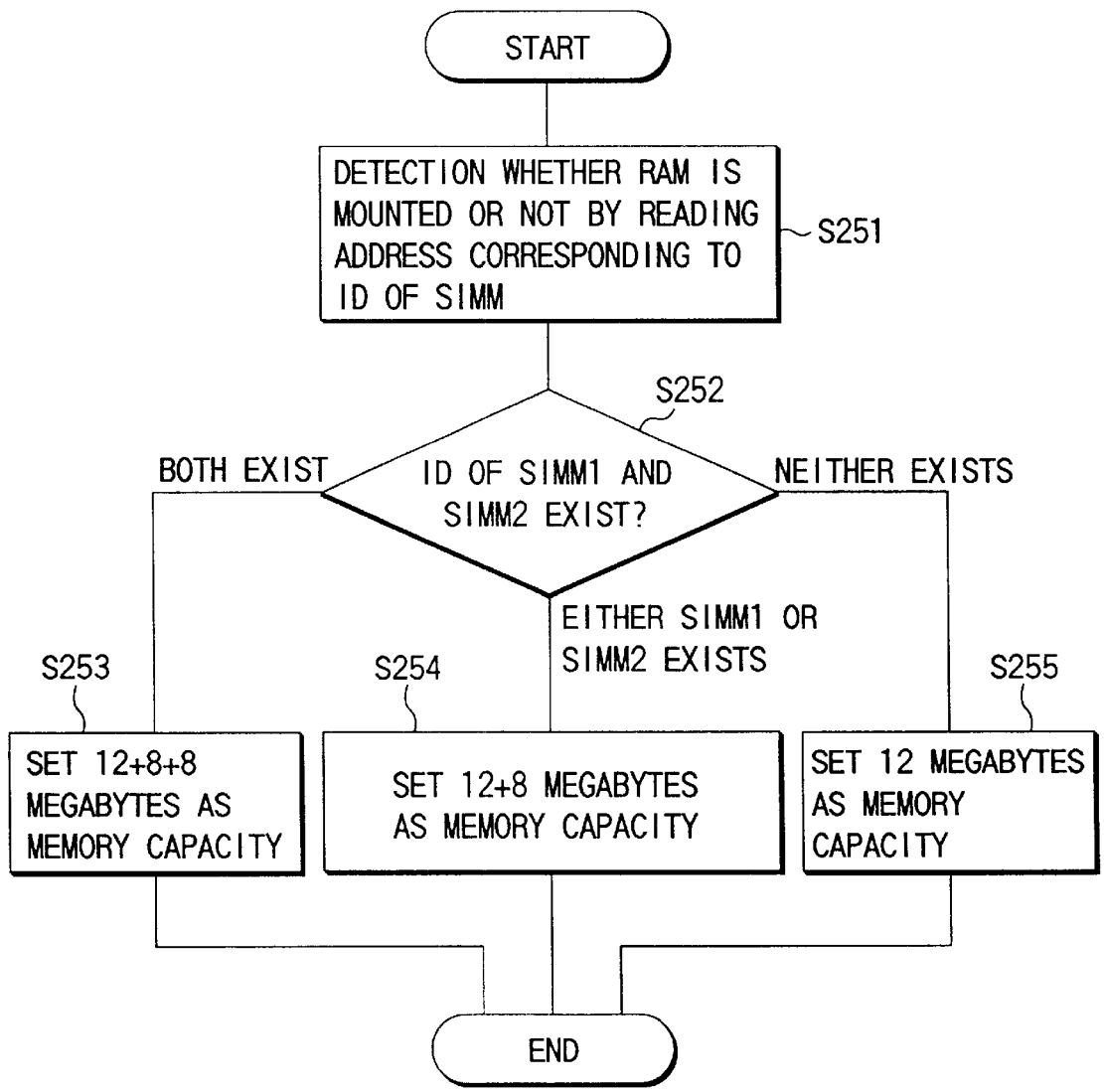
FIG. 34 is a flow chart showing an operation of detecting a packaging capacity of RAM.

SMCPU 311 in step S251 of FIG. 34 accesses by forming an address corresponding to an identification code ID of SIMM and thereby detects whether or not an option RAM is mounted.

When SIMM1 and SIMM2 of an RAM board are both mounted, it is detected in step S252 and then (12+8+8) megabytes as a memory capacity are set in advanced step S253.

When either SIMM1 or SIMM2 of the RAM board are mounted, it is detected in step S252 and then (12+8) megabytes as a memory capacity are set in step S254.

When neither SIMM1 nor SIMM2 of the RAM board are mounted, it is detected in step S252 and then (12) megabytes as a memory capacity are set in step S255.

In such a manner, a memory capacity mounted as an RAM memory is detected at the same time as when power is applied.

The operator console panel 114 will in a detailed manner be described in reference to FIG. 6.

The operator control panel 114 comprises: a finisher key 115; status indicator 117; feed cassette selection key 119 as means for selecting a feed cassette 30; HELP key 123; automatic paper selection key 125; automatic magnification selection key 126; zoom/100% key 127; original size key 128; paper size key 129; message indicator 116; automatic density key 130; manual density key 131; preheat key 132; interrupt key 133; all clear key 134; clear/stop key 135; start key 121; timer key 136; ten key 118; and function switch key 136.

The finisher key 115 is used when a sort mode, group mode or staple mode are selected.

The status indicator 117 indicates a status of the copying machine by displays of various kinds of pictures and characters while flashing.

The cassette key 119 can be used for select a different cassette by pushing this key if a selected cassette is not of a desired size.

The HELP key 123 is a operation guide key, a message showing operational procedures is displayed on the message indicator 116 and if the key is pushed after a function is set, a content of the setting can be confirmed.

The automatic paper selection key 125 is normally set in an automatic paper selection mode. A size of an original placed on the original table (made of glass) 2, is automatically detected and the same paper size as that of the original is automatically selected (equal-size copy only).

The automatic magnification selection key 126 detects an original size placed on the original table (glass) 2 and calculates a copy magnification automatically if the key is pushed and a desired paper size is designated.

The zoom/100% key 127 is operated such that if a [50%<] key at the left end is pushed, a copy magnification is reduced at a decrement of 1% down to 50%, whereas if a [>200%] key at the right end is pushed, a copy magnification is increased at an increment of 1% up to 200% and if a [100%] key at the center is pushed, a copy magnification is returned to equal-size (100%).

The original size key 128 is used for setting an original size. If an original size is designated by selecting a paper size, a copy magnification is automatically set.

The paper size key 129 is used when a paper size is selected.

The message indicator 116 displays a status of a digital copying machine, operational procedure and an instruction to a user with a character and a picture. The message indicator 116 as indication means includes a touch panel and can conduct setting of a function. As described later in detail, various indications are displayed on the message indicator 116: for example, an acceptance indication of an advance copy order, and indications of nearly memory-full and printing indication in accompany with this.

If the automatic density is selected in the automatic density key 130, the digital copying machine automatically detects a density of an original and thereby selects the optimum copy density.

On the manual key 131, a desired copy density can be selected. If a [light] key at the center is pushed, a density can be reduced in five levels and if a [dense] key at the right end is pushed, a density can be increased in five levels.

If the preheat key 132 is pushed, the machine enters the preheat (power saving) status and all the display lamps are turned off. This button is again pushed in order to restart for copying.

The interrupt key 133 is used when an interrupt copy is desired in continual copying.

If the all clear key 134 is pushed, a selected mode is all cleared to return to a standard status.

The clear/stop key 135 is used when the number of copies required is corrected or when a copying operation is desired to stop.

The start key 121 is used when a copying operation is started.

If the timer key 136 is pushed, it is displayed when the digital copying machine enters a power-on or -off status (in the case where a weekly timer is set).

The ten key 118 is used when the number of copies is set. The number of copies can be set at a value from one up to 999.

The function switch key 136 is a key which is used for switching a function of the machine such as a facsimile function and a printer function.

Figure 7:
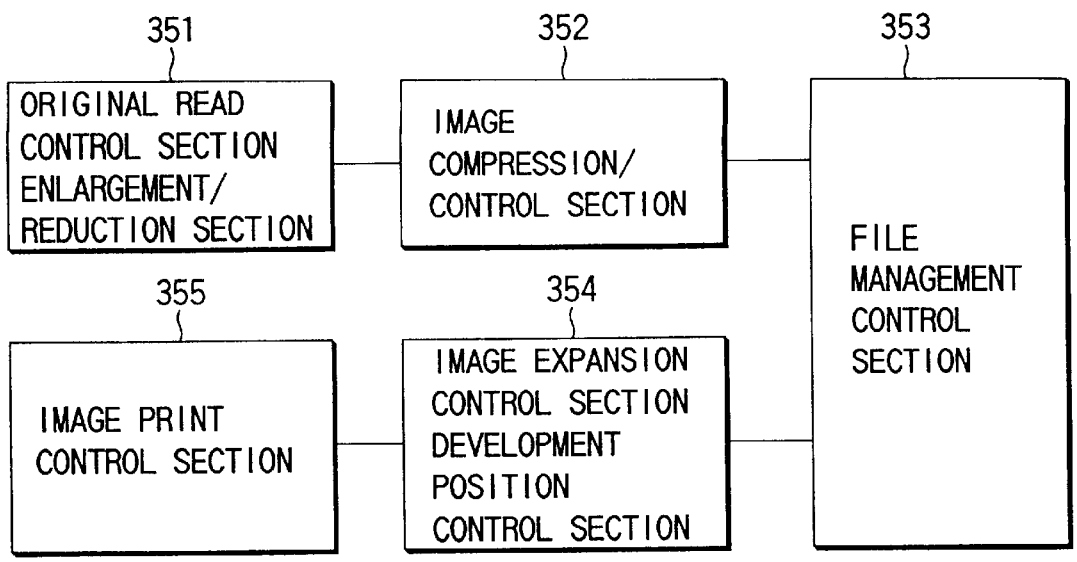
FIG. 7 is a block diagram illustrating a control block of an electronic sort function in an image forming apparatus.

FIG. 7 is a diagram illustrating a control block of an electronic sort function in the image forming apparatus of an embodiment of the present invention.

That is, the control block comprises: an original read control section corresponding to the image processing section 314 and enlargement/reduction section 351; image compression control section 352 corresponding to the page memory 302; file management control section 353; image expansion control section and development position control section 354; and image print control section 355 corresponding to the printer 315.

The enlargement/reduction section of the original read control and the enlargement/reduction sections 351 quantizes image information from the scanner 313 and writes in the page memory 323. That is, in the scanner 313, an image signal from the photoelectric converter 11 is binarized and stored on the page memory 323. If original sheets are set on the original automatic feed device 200, the sheets are fed one by one from the automatic document feeder device 200 to read a content of an original. Here, the original set on the automatic document feeder device 200 is read from the last sheets thereof. If a both-sided original sheet is designated, reading is advanced in the order from the rear side of the last page through the front side of the leading page.

The enlargement/reduction section of the original read control and the enlargement/reduction sections 351 is a sub-module of the original read control section, calculates a reduction or enlargement ratio (hereinafter referred to magnification) form a paper sheet and an original sheet and further sets a quantization processing in the original read section.

In the image compression control section 352 and file management control sections 353, the image information on the page memory 323 is compressed and conducts a read control in an area, which is managed in a file format.

Figure 8:
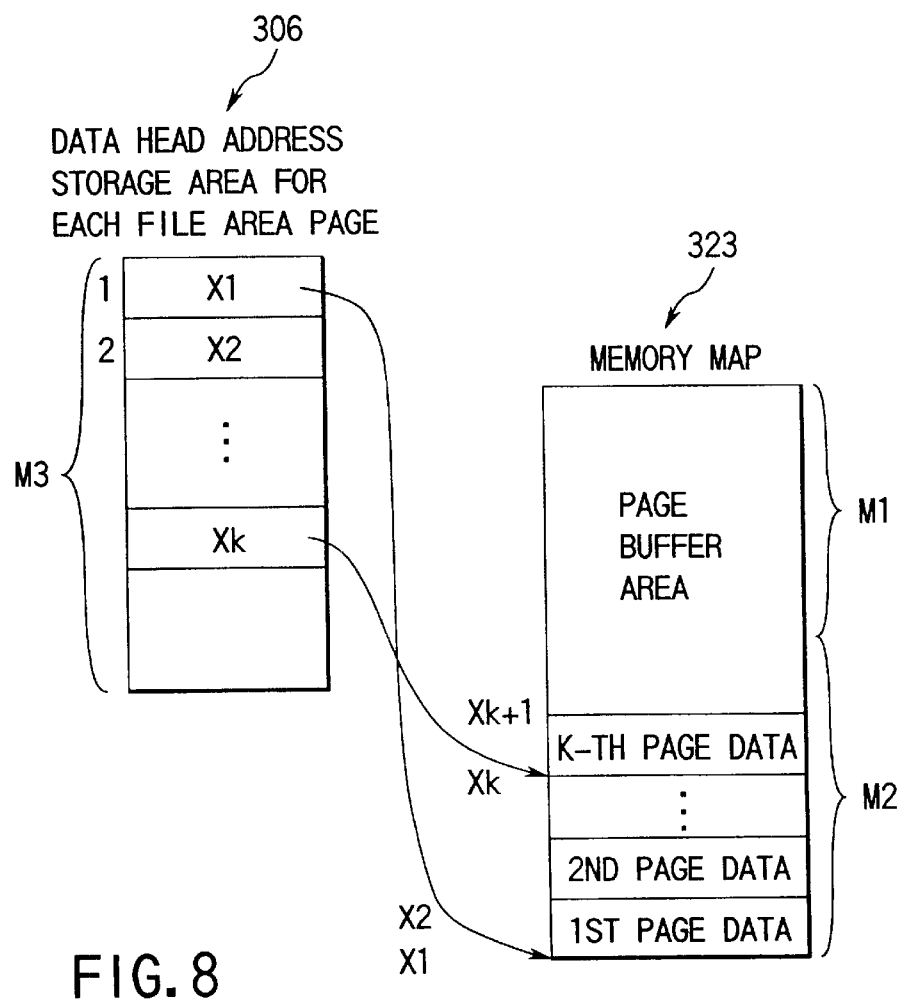
FIG. 8 is a representation showing, in an associated manner, constitutions of an address storage area and a storage area disposed in a page memory.
Figure 9:
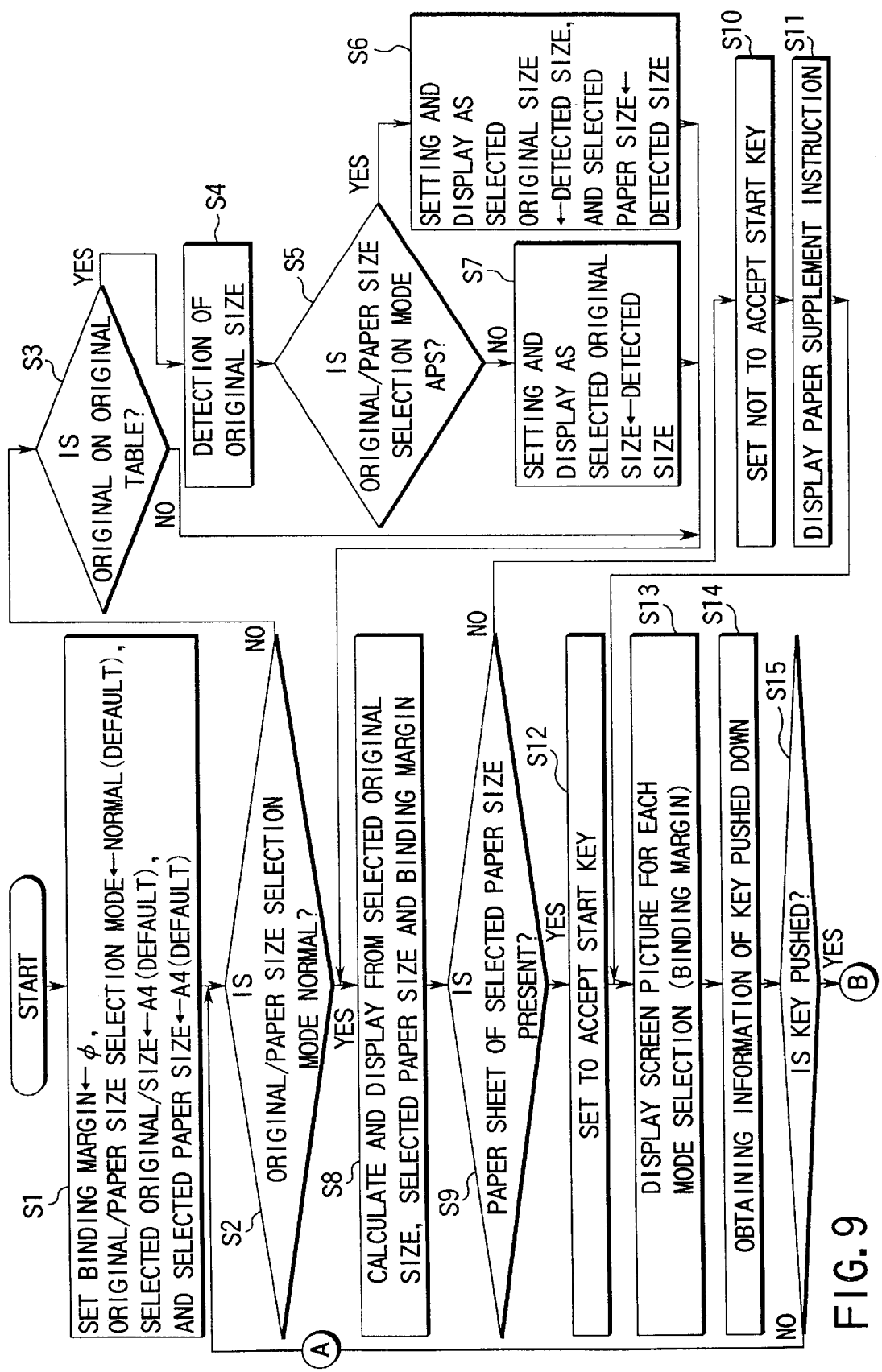
FIG. 9 is a flow chart showing a timing of an original input and print output when being output in staple sort mode.
Figure 10:
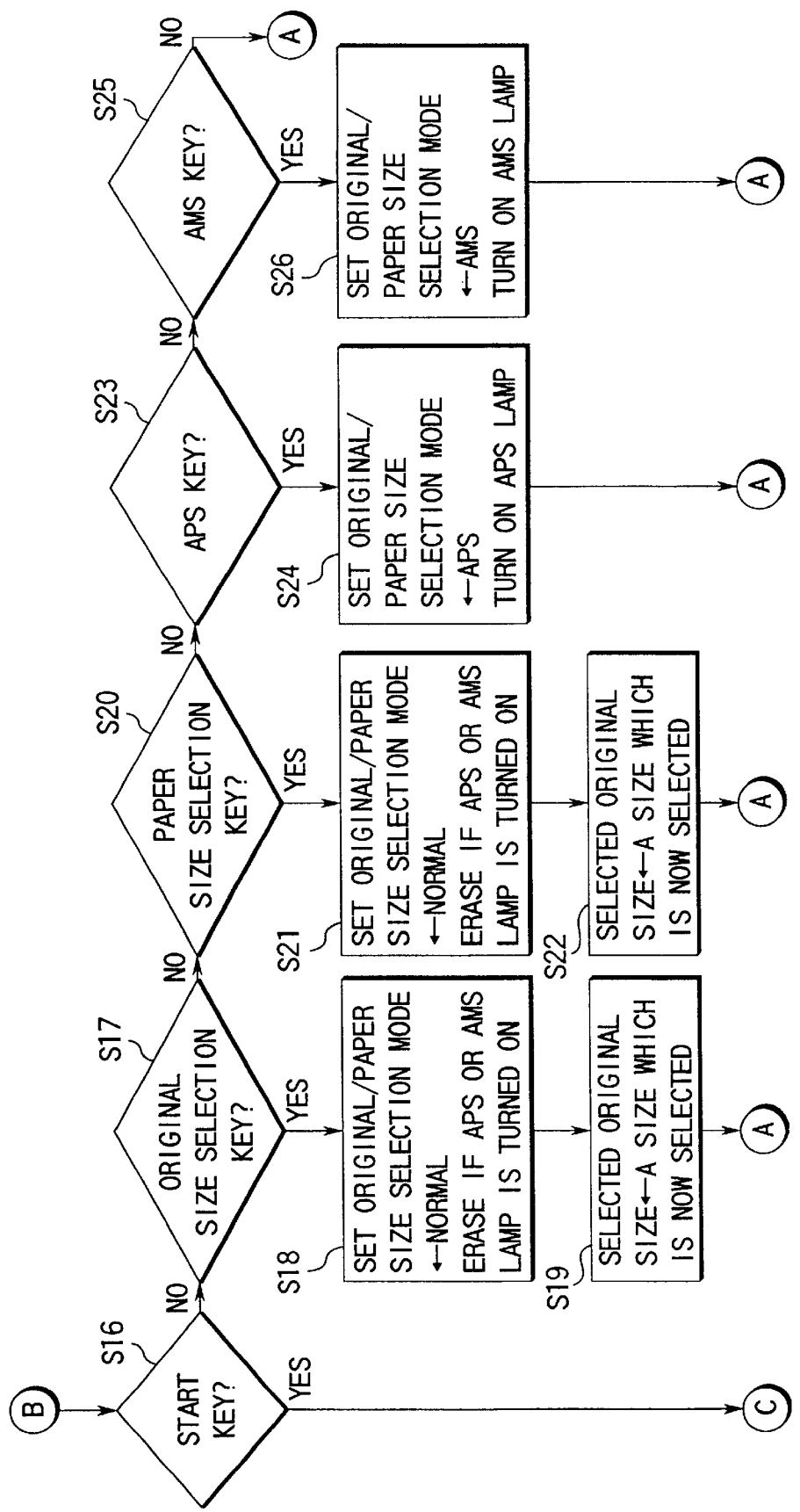
FIG. 10 is a flow chart for illustrating operations of read, storage and printing of an original.

FIG. 8 shows a constitution of a storage area of the image information stored in the page memory 323 and the area is partitioned into a page buffer area M1 in which image information of the original read in the scanner section 313 and a file area M2 which is partitioned into pages each as a unit in which compressed information of the image information is read.

A head address of each page of the file area M2 is stored in information head address storage area M3 for each file area page in an address control section 306.

While a file may be constructed on a volatile memory such as RAM and may be on a non-volatile memory such as a hard disk, in this embodiment the hard disk 90 shown in FIG. 4 is externally disposed, whereby an RAM having a high speed access is used.

When an operator starts copying, an original is set on the automatic document feeder device 200 and the copy key 121 is then pushed. In company with this action, an original sheet is read and imaged information resulted from reading the original sheet is enlarged or reduced in the original read control section and enlargement/reduction control section 351 and compression of the image information is subsequently conducted by the image compression control section 352.

The enlarged or reduced image information is written in a page buffer area M1 of the page memory 323 in the file management control section 353, and the image information is further transformed to a compressed information in the image compression control section 352 and thereafter stored in a file area M2 which is partitioned into pages each as a unit. A set of the above mentioned operations is repeated until all the sheets of the original set on the automatic document feeder device 200 are sent out.

Once all the original information has been stored on the page memory 323, controlling is shifted to read of the image information in a predetermined order for a sort operation. First, in the image expansion control section and development position control section 354, a compressed image information of a first page of a designated document is read out, expanded and developed. The compressed image information stored on the page memory 323 is transferred for storage in the hard disk 90, if it is mounted.

The image expansion and development position control sections 354 read out each page of the compressed image information of the original, an image is formed on each side of a sheet (output page) to be transmitted to the image print control section 355 and such an operation is repeated till the image information of all the pages of the original is read out.

Read-out is determine based on the number of the original pages and it further is determined so that read/print are conducted in correspondence to the order of stacking on the tray 75b of the automatic double side device 75.

In the automatic double side device 75, after rear side printing is completed, paper sheets whose rear sides are printed are stacked on the tray 75b and subsequently the paper sheets are taken out one by one from the tray 75b and subjected to front side printing to be further taken out on the take-out sheet tray 74. In the case where a plurality of paper sheets are printed, after all the rear side printing operations on the paper sheets and stacked on a tray, the paper sheets are subjected to front printing by being taken out from the automatic double side device 75 and further taken out on the take-out tray 74.

Next, operations of read, storage, printing of an original in such a constitution will be described in reference to flow charts of FIGS. 9 to 12.

First, the main CPU 100 displays a selected screen picture on the LCD indicator 116, when a menu is selected by operation on the operator control panel 114 and in this mode selection image, setting of a binding margin, an original/paper size selection mode and the like is conducted (S1). In a normal condition(default), a selected original size is set A4 and a selected paper size is set A4.

When an original/paper size selection mode is not normal (S2) and an original is present on the original table 2 (S3), the original size is detected by the original detecting sensor 169 (S4). When the original/paper size selection mode is APS (S5), that is, the original size is detected by automatic paper select (APS) and a paper sheet being same as the original in size is selected (S6). In this case, a magnification is set 100% if a binding margin is not set.

When the original/paper size selection mode is set AMS (S5), that is, the original size is detected by automatic magnification select (AMS), a paper size which is set at this point is used (S7). In this case, a magnification is determined by sizes of the original and a paper sheet.

In such a manner, a magnification is calculated from a selected original size and a selected paper size and displayed on the LCD indicator 116 (S8).

At this point, the main CPU 100 confirms whether or not a paper sheet which is selected by the paper size detecting sensor 195 is present on the feed cassette 30 (S9), if not a command of the start key (copy key) 121 is not accepted (S10) and a paper supplement command is displayed (S11). When paper sheets of a selected size are present on the feed cassette 30, an command of the start key (copy key) can be accepted (S12).

The main CPU 100 displays each mode selection image (such as a binding margin) on the LCD indicator 116 (S13) and acquires information of operation or pushing down of various keys (S14).

Figure 11:
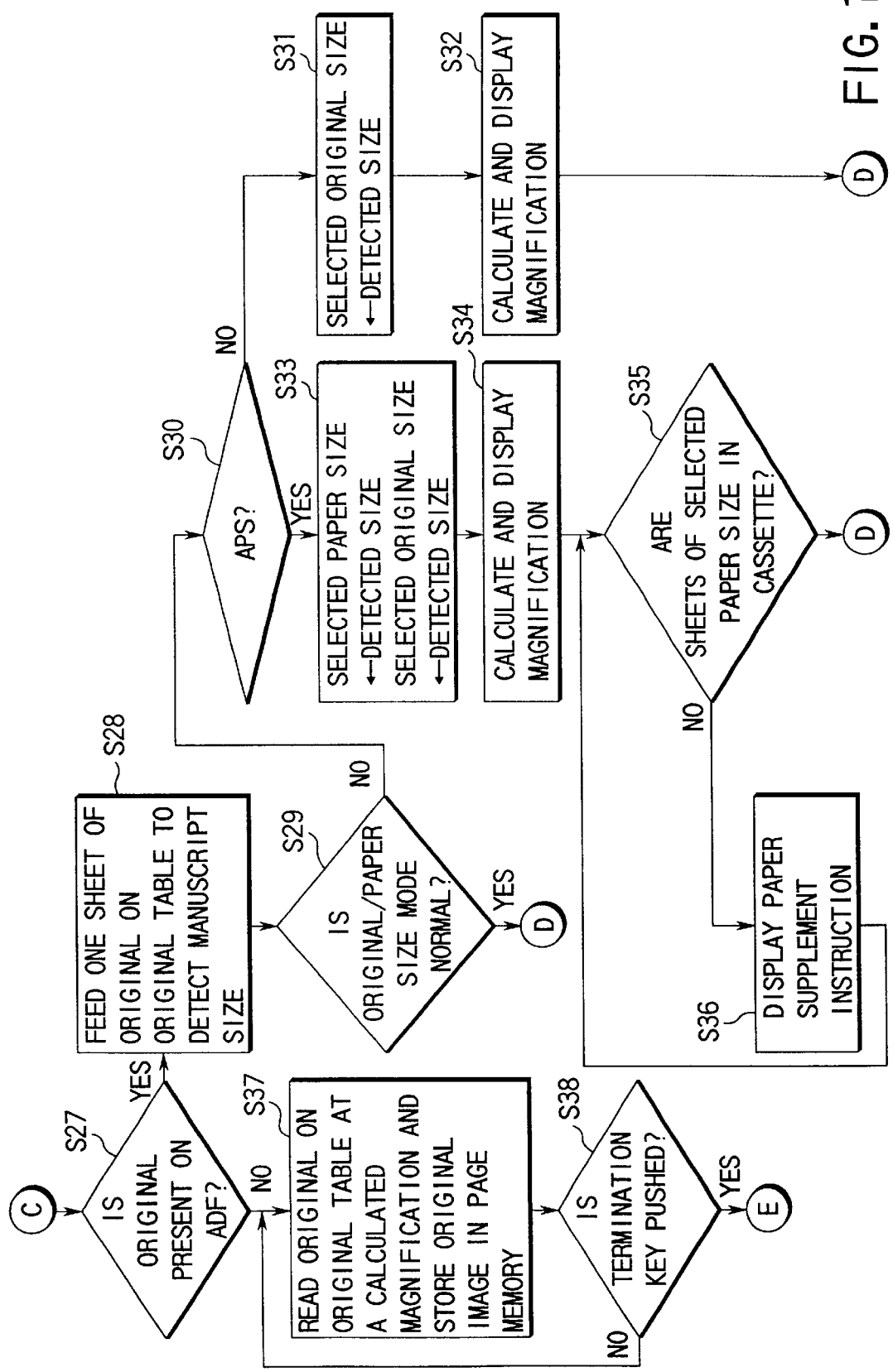
FIG. 11 is a flow chart for illustrating operations of read, storage and printing of an original.

When a key is already pushed down (S15), the main CPU 100 advances operation to step S27 of FIG. 11 from step S16 if a pushed key is the start key (copy key) 121.

In the case of the original size selection key on the LCD indicator 116, the original/paper size selection mode is set normal and in the case of APS or AMS lamp lighting, it is turned off (S18) and operation is returned from step S19 to step S2 setting a paper size which is now selected (S22). In the case of a paper size selection mode on the LCD indicator 116, the original/paper size selection mode is set normal and in the case of an APS or AMS lamp lighting, it is turned off (S21), operation is returned to step S2 setting a paper size which is now selected.

In the case of the APS key on the LCD indicator 116, the original/paper selection mode is set APS, an APS lamp is turned on and operation is returned to step S2 (S24). In the case of the AMS key on the LCD indicator 116, the original/paper size mode is set AMS, an AMS lamp is turned on and operation is returned to step S2 (S26).

In step S27 of FIG. 11, the main CPU 100 checks whether or not an original is present on the automatic document feeder device 200 on the basis of a detection signal from the original detecting sensor 29 and if yes, one page of the original on the automatic document feeder device 200 is fed to detect the original size by the original size detecting sensor 169 (S28). If the original/paper size selection mode is normal, operation is shifted from step S29 to step S39 in FIG. 12.

If an original/paper selection mode is not normal, and furthermore if it is not APS, a detected size is set as a selected size (S31), a magnification is calculated and displayed on the LCD indicator 116, and operation is shifted to S39 (S32). If it is APS, detected sizes are set as sizes of selected paper and selected original (S33) and a magnification is calculated and displayed on the LCD indicator 116 (S34), and if paper sheets of a selected size are present on the feed cassette 30, operation is shifted from step S35 to step S39, and if paper sheets of a selected size are not present on the feed cassette 30, a paper supplement command is displayed on the LCD indicator (S36).

Figure 12B:
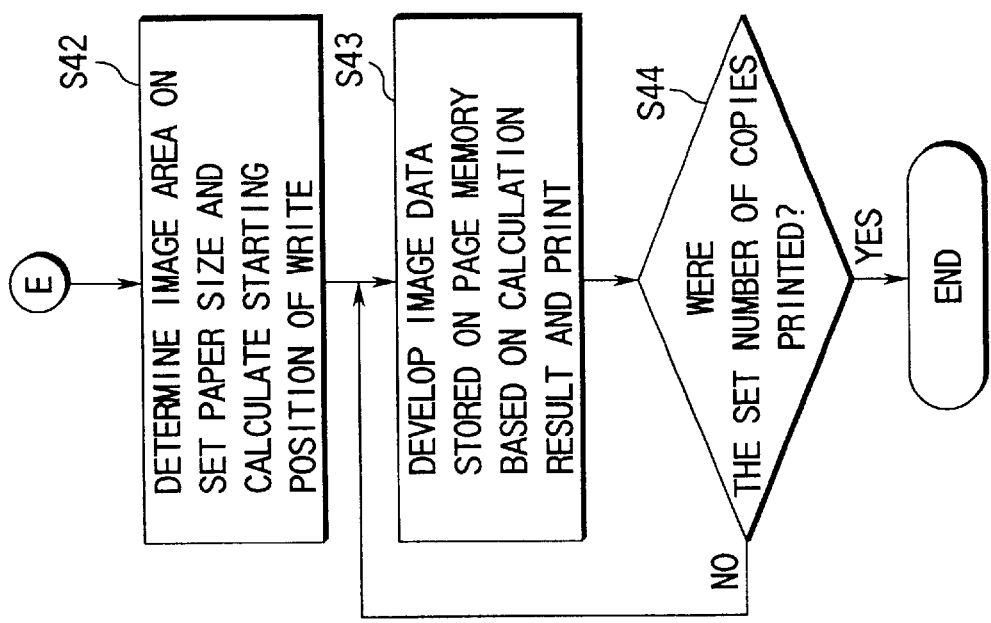
FIGS. 12A and 12B are flow charts for illustrating operations of read, storage and printing of an original.
Figure 12A:
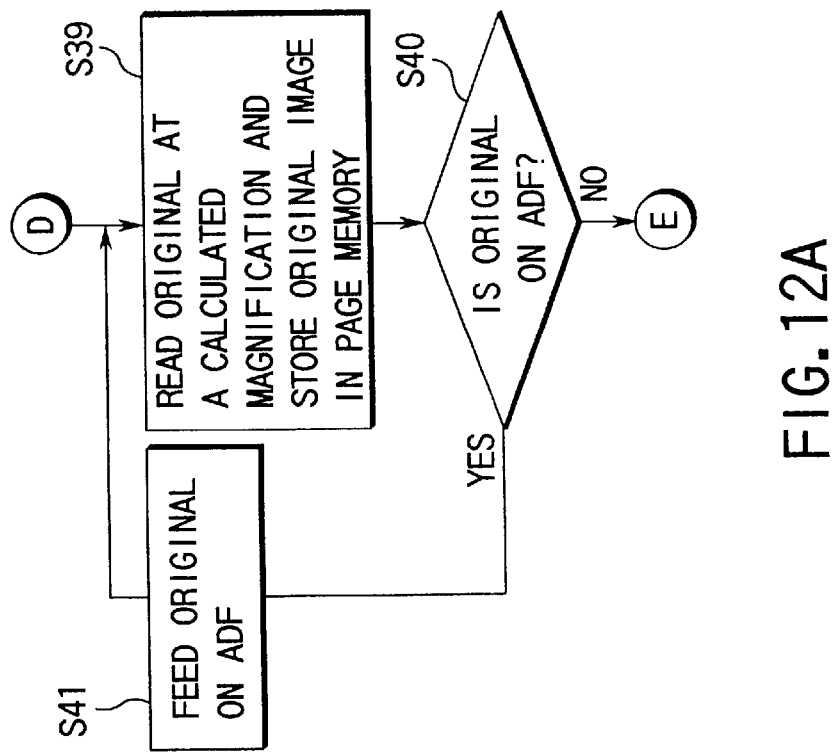

The main CPU 100, in step S27, checks whether or not an original is present in the automatic document feeder device 200 based on a detection signal from the original detecting sensor 29, if an original is not present, the original placed on the original table 2 is read at a calculated magnification, the read original image information is stored on the page memory 323 of the page memory section 302 in a compressed form with one page for each unit information in a condition of one page as one lump (S37) and a termination key on the LCD indicator 116 is pushed and operation is advanced to step S42 of FIG. 12.

The main CPU 100, in step S39, reads an original at a calculated magnification and stores the read original image information on the page memory 323 of the page memory section 302 in a compressed form with one page as a unit information (S39), the original is continued to be read till all the original pages on the automatic document feeder device 200 is fed out to be nothing (S40, S41) and operation is shifted to step S42 after the original is not present.

The main CPU 100, in step S42, determines an image area on a paper sheet of a set size (calculates a start position of write), develops image information stored in the page memory 323 on the page memory 302 on the basis of calculation, prints by the printer 315 through image processing means 314 (S43) and terminates operation when the predetermined number of copies are printed (S44).

While in such a manner, read, storage and printing of the original are conducted, there will be described the case where an original document comprising ten sheets is printed to have three copies of the original document in a staple sort mode and two memory full states occur in the course of printing.

When a staple sort mode on the selection screen picture of the LCD indicator 116 is selected and pushed down, the main CPU 100 further demands for setting of the required number of copies (three copies in this case) to the LCD indicator 116 and the setting requirements are set by an operator.

The main CPU 100 scans (reads) each page of the original document by the scanner 313 and temporarily stores image information in a page buffer area M1 of the page memory 323 in the page memory section 302 by scanning the original pages in the scanner 313, after that, the image information is compressed by the compression/expansion means 324 to transform to a file and stores in a file area M2 of the page memory 323.

As shown in FIG. 13A, when compressed information of page 10, page 9 and page 8 of compressed information is stored in the file areas M2 of the page memory 323 and memory full of the file memory M2 occurs in storage of page 7, page 7 cannot be stored in the file area M2 of the page memory 323. However, image information of page 7 is stored in the page buffer area M1 in the page memory 323 in a before-compression form information.

At this point, the main CPU 100 temporarily stops supply of the original pages from the automatic document feeder device 200 and scanning in the scanner 313 and at the same time, stops outputting of a stapling signal to the stapler 76.

Subsequently, the main CPU 100, as shown in FIG. 13B, expands compressed information of page 10 stored in a file form in the file area M2 of the page memory 323 as the first page in sort output in the compression/expansion means 324 and prints by the printer 315 through the image processing means 314 and such operations are repeated on pages 9 and 8 to output the three pages in the first copy of the original document in printing and then load them on the take-out tray 74.

Since this case is set to print three copies of the original document, as shown in FIGS. 13C and 13D, the operations are repeated for the second and third copies of the document and the three copies are stacked on the take-out tray 74. In this case, the main CPU 100 drives the tray driver 229 to shift the take-out tray 74 so that printed paper sheets of each of the first, second and third copies may be stacked being shifted one position for each copy of the original in an easily discernible manner.

With these series of operations, since compressed information in the file area M2 of the page memory 323 has been eliminated, the main CPU 100 compresses the image information of page 7 stored in the page buffer area M1 of the page memory 323 in the compression/expansion means 324 to form a file and then store the file in the file area M2 of the page memory 323.

Then the main CPU 100 starts feeding the original pages from the automatic document feeder device 200 and scanning in the scanner 313 and stores the original information of pages 6 to 4 one by one in the file area M2 of the page memory 323.

FIG. 14A shows the steps from re-compression/file creation through re-scanning/storage. Here, when memory full of the file area M2 in the page memory 323 occurs in storage of page 4, page 4 information cannot be stored in the file area M2 of the page memory 323. However, the page 4 information is stored in the page buffer area M1 of the page memory 323 in a before-compression form.

At this point, the main CPU 100 temporarily stops supply of the original pages from the automatic document feeder device 200 and scanning in the scanner 313 and at the same time, stops outputting of a stapling signal to the stapler 76.

Subsequently, the main CPU 100, as shown in FIGS. 14B, 14C, and 14D, expands and prints compressed information of pages 7, 6, 5 stored in the file area M2 of the page memory 323 and such operations are repeated to output three pages for each of the pages of the original document in printing and then load printed sheets of each of the three copies on the take-out tray 74. In this case, the main CPU 100 drives the tray driver 229 to shift the take-out tray 74 so that printed paper sheets of each of the first, second and third copies of each pages may be stacked while being shifted one position for each copy of the original in an easily discernible manner.

With these series of operations, since compressed information in the file area M2 of the page memory 323 have been eliminated, the main CPU 100 compresses the image information of page 4 stored in the page buffer area of the page memory 323 in the compression/expansion means 324 to create a file and then stored in the file area M2 of the page memory 323. Then the main CPU 100 starts feeding the original from the automatic document feeder device 200 and scanning in the scanner 313 and stores the original information from page 6 and thereafter in the file area M2 of the page memory 323.

FIG. 15A shows the steps from re-compression/file creation through re-scanning/storage.

After scanning, compression and file creation for the rest of pages of the original, and storage in the file area M2 of the page memory 323 are completed, the main CPU 100, as shown in FIGS. 15B, 15C, and 15D, expands and printed the compressed information of pages from 4 to 1 and stacks printed sheets corresponding to each of pages from 4 to 1 for three copies of the original in that order in a repeating manner on the take-out tray 74.

In this case, the main CPU 100 drives the tray driver 229 to shift the take-out tray 74 so that printed paper sheets of each of the first, second and third copies of each pages may be stacked while being shifted one position for each copy of the original in an easily discernible manner. The main CPU does not output a staple shoot signal.

As a result, there are loaded on the take-out tray 74 by three printed sheets for each of three pages of the original, three sheets for each of three pages thereof and three sheets for four pages thereof, wherein printed sheets of the stack are positioned in a shifted manner with one position for each copy of the original and thereby terminating image forming operation without stapling.

In the staple mode, even if stack full occurs when the automatic double side device 75 is used to perform double-sided printing and paper sheets each on one side of which is printed are stacked on the tray 75b of the automatic double side device 75, it is possible that printing is not stopped and print output is performed without stapling:

As mentioned above, in a staple mode in which sort and stapling are performed for each copy of an original, even if a storage memory suffers from memory full in the course of inputting the original, print outputting is conducted, though without stapling, and all the original can be print output as copies while avoiding complete shutdown of printing.

In this embodiment wherein such a basic image forming operation is performed, the present invention has a variety of characteristic constitutions and functions described below. The characteristic constitution and functions will below be described in a detailed manner in reference to FIG. 16 and the following figures.

First, an embodiment of the present invention has a constitution and functions that timing of deletion of image information, when printing of the last page of a copy in a sort operation is conducted, can be switched in the optimal way according to whether or not a large capacity storage device, which is a hard disk device 90 in this embodiment, is connected to an image forming apparatus.

In order to attain the constitution and function, when the image forming apparatus is started by application of power, it is checked whether or not the hard disk device is mounted in step S101.

For example, if the hard disk device 90 is mounted, a micro-switch not shown assumes ON and a flag [1] is set in a register in a base section CPU 301 by an ON signal. Therefore, when power is applied on the image forming apparatus and the system is activated, SMCPU 311 checks this flag in step S101 and if the flag is [1], it is detected that the hard disk device is mounted.

Alternately, when the system of the image forming apparatus is activated by application of power, an initialization command is transmitted to the hard disk device 90 from SMCPU 311 and if a status [1] is received, it is judged that the hard disk device 90 is present. To the contrary, if there arises a condition that a status [1] cannot be received lasts, for example for 1 second, it is judged that no hard disk device 90 is present.

As a result, if mounting of the hard disk device 90 is detected, operation is advanced to step S102 and a first electronic sort mode is set. While as operations of a sort mode, there are two cases, in one of which each of copied documents which are printed output are stapled, and in the other of which copied documents which are printed output are output without stapling. The former case in which copied documents are stapled before delivered will be described as an example.

FIGS. 17A to 17D show timings of an original input and print output in the staple sort mode in the first electronic sort mode. In FIGS. 17A to 17D, timings of an original input and a print output is described when an original document comprising a plurality of paper sheets (4 sheets in this case) set on an automatic document feeder device 200 is input and three copied documents are output in the staple mode.

First, the main CPU 100, in step S103, makes all the original pages read by the scanner 313 and read image information is compressed in the page memory section 302 through the image processing device 314 with one page as an information unit and sequentially stored in the file area M2 of the page memory 323.

Figures 17A, 17B, 17C, 17D:
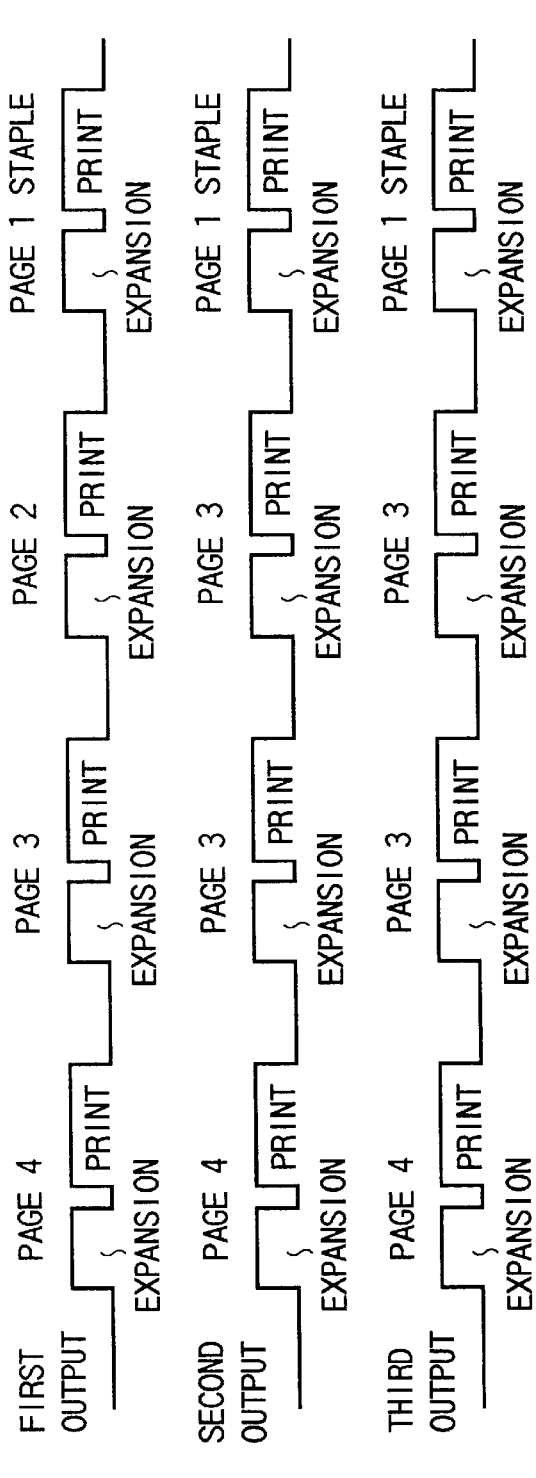
FIGS. 17A to 17D show, in combination, a timing chart showing timings for each page in read, compression and file creating operations.

That is, as shown in FIG. 17A, an original image of page 4 is read by optical scanning in the scanner 313, temporarily stored in the page buffer area M1 of the page memory 323 in the page memory section 302, compressed in the compression/expansion section 324 to create a file and stored at an address X1 of page 1 of the file area M2 of the page memory 323. The operation is respectively repeated for pages 3 to 1 in that order.

In such a manner, the document image information is stored in the file area M2 of the page memory 323 in a compressed form. While, in the above description, compression of image information read by use of the page memory 323 and the compression/expansion circuit 324 is conducted, needless to say that if the hard disk device 90 has a circuit conducting theses functions, image information may directly be stored in the hard disk device 90 by use of such functions thereof.

Subsequently, the main CPU 100 reads the stored compressed information in a form of a file from the hard disk device 90 and the compressed information is then transferred to be stored in the file area M2 of the page memory 322. Then, the stored compressed information in a form of a file is expanded in the compression/expansion section 324 and supplied to the printer 315 through the image processing section 314 for printing.

That is, the main CPU 100, as shown in FIG. 17B, reads a compressed information of page 4 stored in a form of a file at an address of the file area M2 of the page memory 323 as the image information of the first page for the first copy of a document sort output and transmits it to the image processing device 314 after expansion in the compression/expansion section 324 for printing at the printer 315. The operation is repeated in each of pages 3 to 1 of the document in that order to print the first copy thereof (step S104).

The main CPU 100 sends a stapling signal to the stapler 76 to inform of completion of the first copy of the document after page 1 (a leading page) is printed and the first copy of the document (comprising 4 sheets) is loaded on the take-out tray 74 in a stapled form by the stapler 76. Since the predetermined number of copied documents are 3 copies, the same staple sort operation is repeated, as shown in FIGS. 17C and 17D, for each of the second and third copies.

When printing of the fourth page of the document for the last third copy is finished in step S105, the image information used for the printing of the fourth page is deleted from the hard disk device 90 in step S106 immediately thereafter. In a similar way to this, deletion of each page image information of pages 3 to 1 of the document is sequentially deleted in the order immediately after printing.

When it is detected that printing of the last sheets for the forth page is finished, operation proceeds to step S108 and the corresponding page image information is deleted from the hard disk device 90. At this point, the main CPU 100 sends a stapling signal to the stapler 76 to inform of completion of the third copy of the document (comprising 4 sheets) and the third copy is stapled by the stapler 76 to be loaded on the take-out tray 74.

In the case where the hard disk device 90 is mounted in such a manner, since information is deleted from the hard disk device 90 each time when printing each page of the last document copy is completed, the information to be deleted after all the printing operation is only of the last page and the operation of information deletion can be finished in a comparatively short time because there is only a need for access to the stored information corresponding to one page, though the access speed thereof is slow. It is needless to say that a merit of mounting a large capacity storage device is enjoyed without any reduction of the merit. Therefore, there is provided an image forming apparatus with not only a large storage capacity but fast processing speed.

On the other hand, in the case where it is detected that the hard disk device 90 is not mounted in step S101, operation proceeds to step S110 to set a second electronic sort mode.

In the second electronic sort mode, in a similar way to the case of the first electronic sort mode, first the main CPU 100 makes an original read by the scanner 313 in step S111 and read image information is compressed one page as unit information in the page memory section 302 through the image processing device 314 and sequentially stored in the file area M2 of the page memory 323. In this case, since the hard disk device 90 is not mounted, the compressed image information is stored in the page memory 323 without any further processing.

Subsequently, the main CPU 100 expands the compressed information stored in the file area M2 of the page memory 323 in the compression/expansion section 324 and prints the information by supplying the information to the printer 315 through the image processing section 314.

That is, the main CPU 100 reads the compressed information of page 4 stored in a form of a file at an address X1 of the file area M2 of the page memory 323 as the image information for the first page of the first copy of document sort output, expands the compressed information in the compression/expansion section 324 to send to the image processing device 314 and prints the information in the printer 315. The operation is repeated in each of pages 3 to 1 of the document in that order to print the first sheet of each copy thereof.

The main CPU 100 sends a stapling signal to the stapler 76 to inform of completion of the first copy of the document after page 1 (a leading page) is printed and the first copy of the document (comprising 4 sheets) is loaded on the take-out tray 74 in a stapled form by the stapler 76. Since the predetermined number of copied documents are 3 copies, the same staple sort operation is repeated, as shown in FIGS. 17C and 17D, for each of the second and third copies and operation is continued till all the three copies of the document are sequentially loaded on the take-out tray 74 in step S113.

When a staple operation for the third copy of the document is finished, the main CPU 100 accesses the page memory 323 to delete the image information of all the pages of the document at one time. In this case, since the page memory 323 is constructed with a high access speed RAM, much time is not required for the information to be deleted.

Figure 16:
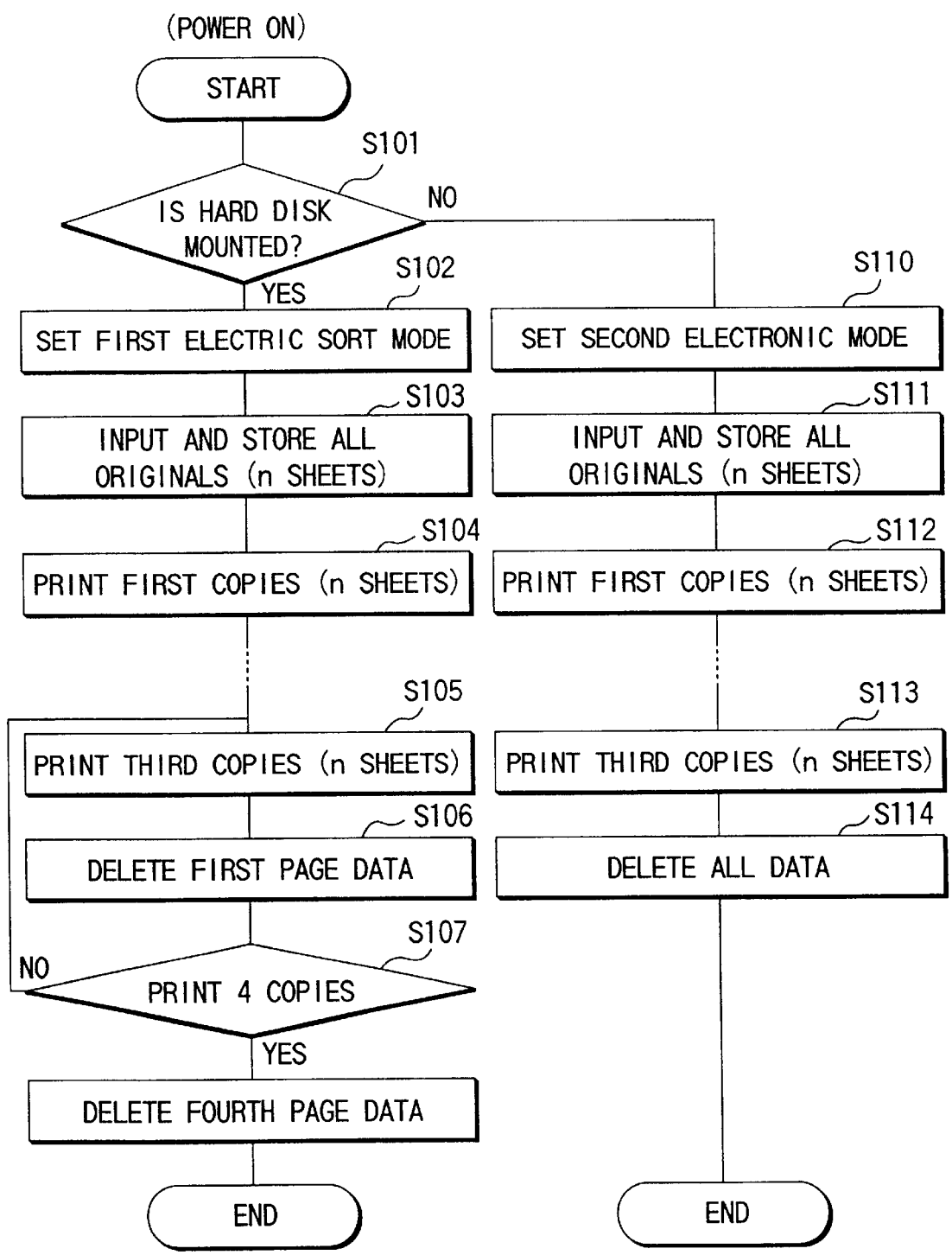
FIG. 16 is a timing chart for illustrating a switching operation of timings in deletion of an image information when a sort operation is finished with and without a hard disk device provided.

In an operation of the electronic sort mode described in FIG. 16, there is described the case where after the image information of all the pages of the document to be copied are first stored in a memory, deletion timing of the image information after completion of printing is switched according to whether or not the hard disk device 90 is mounted but in a similar way it is also possible to switch job running states according to whether or not the hard disk 90 is mounted. That is, since a speed is especially slowed in the case of sequential access to discontinuous storage areas in the hard disk 90, it is desirable that a job running state in which access areas are disposed so as to be accessed in a close to contiguous condition is selected.

When a hard disk 90 is mounted, a running state of a so called a completion type is assumed in which after all the original is read, a predetermined number of copy documents is printed, as shown in steps of S103 to S108.

Figure 18:
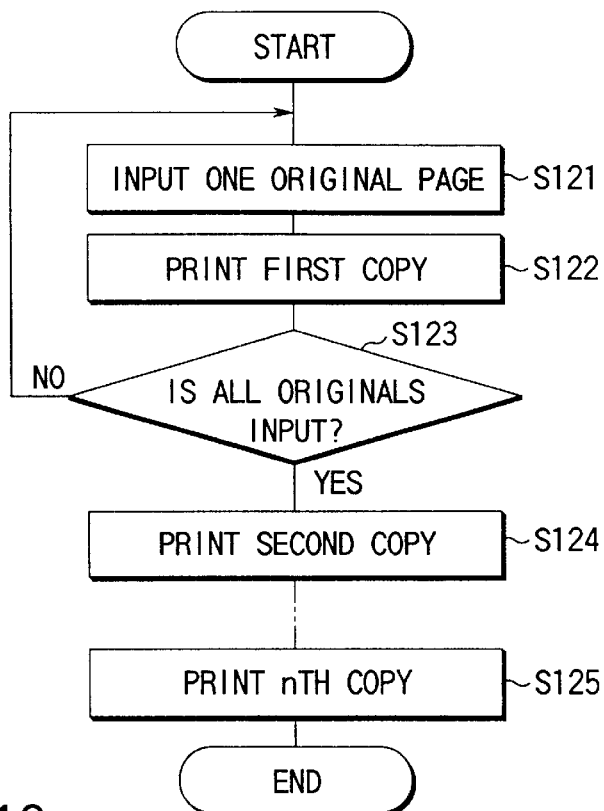
FIG. 18 is a flow chart showing a switching operation of information deleting methods based on the presence or not of a hard disk apparatus.

When a hard disk 90 is not mounted, a job running state as shown in the flow chart of FIG. 18 is assumed without execution of a process from steps S111 to S114 of FIG. 16.

That is, in step S121 of FIG. 18, image information of the first page of a document to be sorted is stored at an address X1 of the file area M2 of the page memory 323 after creating a file.

Then the stored image information is read in step S122 and sent to the printer 315 to print. In a similar manner, it is checked whether or not all the pages of a first copy of the original are completed in S123 and if yes, operation is advanced to step S124 to start printing of a second copy. In such a manner, a so called a sequential operation type job is executed.

Since input of original image information is completed when printing of all the pages of a first copy of the original is over, a second copy is simply printed by sequentially reading compressed image information from the file area M2 of the page memory 323.

At the same time when printing of a predetermined mth copy of the original is completed in step S125 in such a manner, the image information of all the pages of the original is accessed and deleted at one time.

In description of FIG. 16, the case where timing of image information deleting is switched according to whether the hard disk 90 is mounted, but switching of a method to delete the image information can be effected according to a running state of a job.

Figure 19:
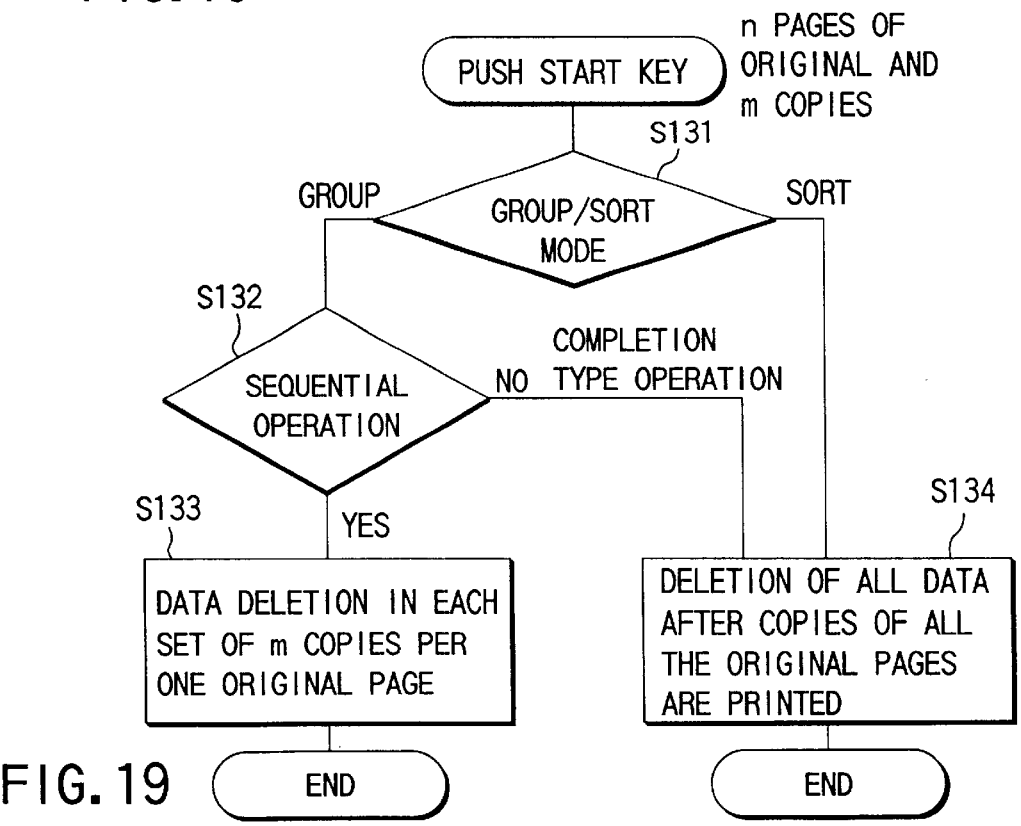
FIG. 19 is a flow chart showing a switching operation of job running states based on a job running state.

FIG. 19 shows a flow chart to illustrate of an operation of an example of the latter case. Two running states of a job are available in this case: a group copy mode to produce the whole of a predetermined number of copies of each page of an input document in a lump and a sort copy mode to print each copy of the document as a unit. Furthermore, in the group copy mode, there are available a sequential type in which image information of each document page is deleted each time when the whole of a predetermined number of the document page is printed and a completion type to delete all the image information of the document in one lump after a predetermined number of copies of the document are all printed.

In FIG. 19, if an operator pushes a start key 121 after setting an original constituting a document of a plurality of pages on a read device, a check is performed on whether job selection is a group copy mode or a sort copy mode in step S131.

When the group copy mode is selected, operation is advanced to step S132 and a check is again performed on whether the group copying is selected as of the sequential type or of the completion type.

When the sequential type is selected, operation is advanced to step S133 and the original image information of a first page of the document is stored in a file at the address X1 of the file area M2 of the page memory 323.

Thus stored original image information is read, expanded and sent to the printer 315 to produce a predetermined number m of copies of the image information in a lump successively. In this case, since the stored information is unnecessary after the predetermined number m of copies of the image information is printed, the stored information can be deleted from the page memory 323. That is, since the page image information can be deleted each time when a predetermined number of copies of a page is all printed in the case where a sequential operation is effected in a group copy mode, memory full is hard to occur in the page memory 323 and thereby increasing operability of an image forming apparatus.

When it is detected as a result of checking in step S131 that a sort copy mode is employed and when it is detected as a result of checking in step S132 that a group copy mode operation is of a completion type, operations are both advanced to step S134 and the original image information of all the pages is input, read and printed, and thereafter all the stored information is deleted at one time.

As described above, a deletion method of memory can be switched in various ways depending on a job running state.

Besides, according to this embodiment, timing at which memory full occurs in the page memory 323 can be switched while a high operability condition is maintained based on whether a storage area for image information is large or small, for example whether a hard disk 90 is mounted or not.

In the case of ordinary memory full, processing for setting a memory full state is performed if a residual capacity of a write area is less than a quantity required for one page of compressed image information when the compressed information is fetched from a compression/expansion circuit 324 and written in the file area M2 of the page memory 323. Since a storage area for the image information is small in the case where a hard disk 90 which is a large capacity storage device is not mounted, it is set such that setting of memory full can be performed when the condition is the case. This case is referred to as file system (1).

On the other hand, since a storage area for image information is large in the case where the hard disk 90 is mounted, a condition for recognizing a state as memory full is determined by use of a different criterion. That is, in an example of this embodiment, a residual capacity of a write area before setting of memory full is set such that the residual capacity is the maximum size which an image forming apparatus allows for the purpose, for example a storage capacity in which the original image information of an A3 size can be stored without any application of compression thereto (hereafter referred to as reference capacity). This case is referred to as file system (2).

Description will below be made on a mechanism in which memory full occurs in an operation of write to a file in the file system (2) in reference to FIG. 20. In step S141, which is the first step of FIG. 20, compressed image information is fetched from the compression/expansion circuit 324 and written to the file area M2 of the page memory 323. Since a choice of setting of the file system (1) or the file system (2) is determined by whether or not the hard disk 90 is mounted, this check is conducted in a similar way to step S101 of FIG. 16. Here a flow after, as a result of this check, it is found that the hard disk 90 is mounted, is shown.

A residual area of the file memory M2 of the page memory 323 is checked on whether or not the residual area is equal to or less than the reference capacity in step S142 after write of the compressed image in the file area M2 of the page memory 323 is over. If yes, operation is advanced to step S143 and a near memory full flag is set.

After that, a check is conducted in step S144 on whether or not a compressed image information from the compression/expansion circuit 324 is present, in other word, whether or not compression of the image information of one page is over and if no, operation is returned to step S141 to repeat a similar process.

If yes, operation is shifted to step S145 and a status value of a memory full flag is returned and reset is conducted to terminate the processing.

As described above, since A3 which is the maximum size which can be allowed by the image forming apparatus is used as a reference capacity for a decision criterion on memory full in step S142, an actual residual capacity which is usable is a capacity sufficient for storage the compressed information of one page even in a memory full condition, and since there is an extra storage capacity for one page, there is no need for write to a file area to be stopped, which is different from the case of the file system (1), and the image information which is already set on the scanner 313 at the time in point when the memory full occurs is written to the file area M2 of the page memory 323 and thereafter the apparatus is stopped, whereby operability as a system is improved.

In this way, even in the case where a staple sort mode is set and the file area M2 of the page memory 323 becomes memory full half way, operability is not reduced.

Figure 21:
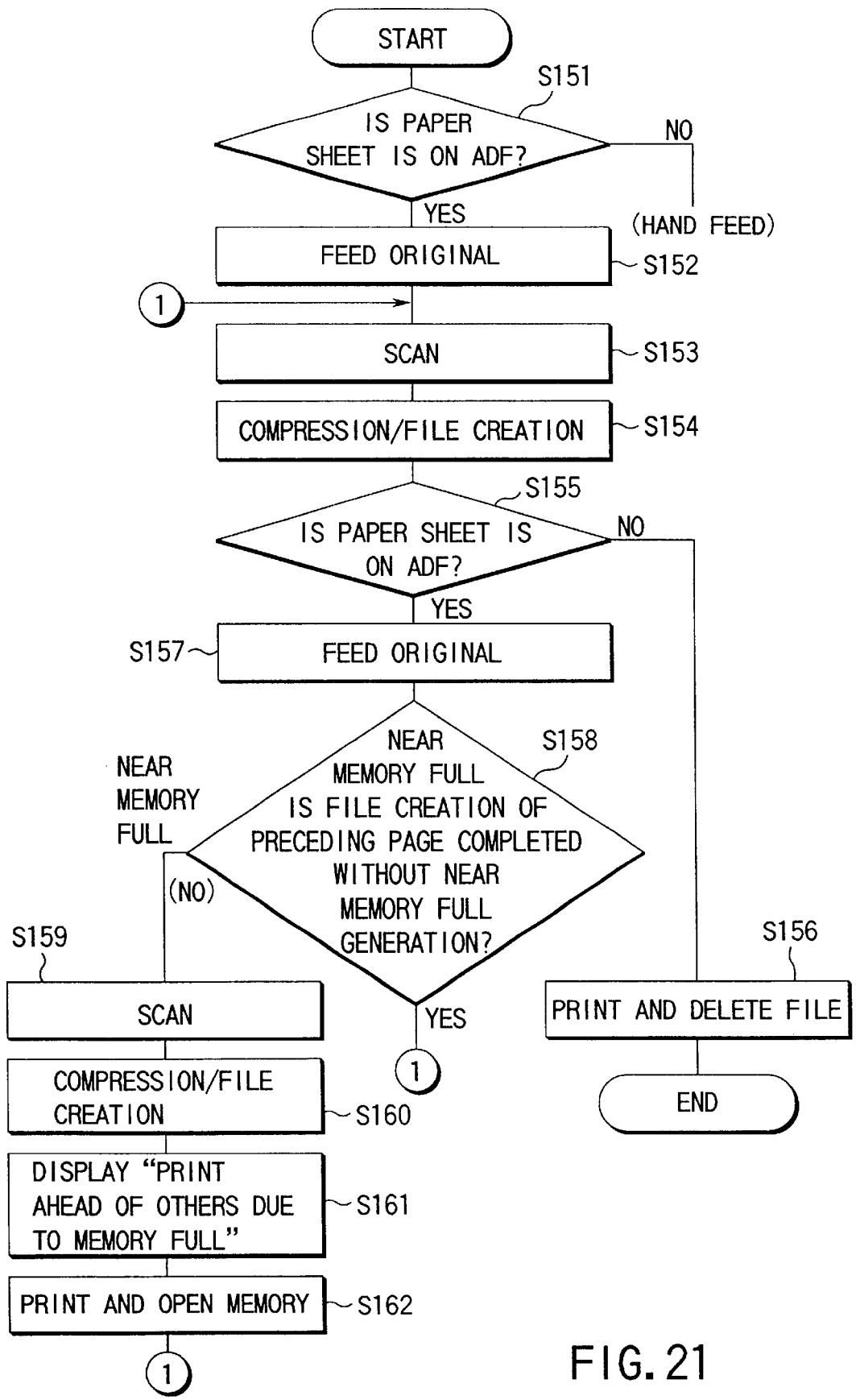
FIG. 21 is a flow chart showing an operation performed when memory-full occurs in a sort copying mode.

In a flow chart shown in FIG. 21, there are described a series of operations in the embodiment having a feature that memory full is set and displayed and read operations on pages following directly and thereafter are stopped, even though all the image storage areas are not used up, when the image information is stored to the file area M2 of the page memory 323 up to a condition where the residual empty area of the file area M2 of the page memory 323 is less than the size in which an image information of one page can store.

In a flow chart shown in FIG. 21, there are shown operations after a copy key 121 is pushed down and a copy operation is started. In step S151, which is the first step of FIG. 21, it is checked whether or not an original to be copied is set on an automatic document feeder device (ADF) 200. If no, a so called hand feed mode is set, which is omitted.

If yes, a first original page is guided to the original table 2 from ADF 200 in step S152 and an original scan section 140 is activated to scan the surface of the original page and generate original image information in a digital mode in step S153.

The original image information formed is transmitted to a page memory section 302 and compressed by use of the compression/expansion circuit 324 and the page memory 323 in step S153 and compressed image information is written in the address X1 of the file area M2 of the page memory 323.

When the image information of the first page is stored, a check is conducted on whether or not the following page is present on the ADF 200 in step S153. If no, operation is shifted to step S156, printing of a predetermined content is conducted by use of the image information thus far stored in the file area M2 of the page memory 323 and thereafter the image information is deleted.

Even if near memory full of the file system (2) described in FIG. 16 occurs in creation of a file for the image information of the last page, a predetermined sort operation or the like can be performed without any disturbance since information for which a file has not been created can be made as a file.

When it is detected that another page is on ADF 200 in step S155, operation is advanced to step S157, the page is guided to the original table 2, the surface of an original is scanned by activating the original scan section 140 and the original image information of a digital mode is formed in a file. The formed original image information is sent to the page memory section 302 to be compressed and to create a file.

A check is conducted in step S158 on whether or not a file is normally created without generation of near memory full on the image information of the preceding page in the course of file creating for the page information. When file creation is normally performed, operation is shifted back to step S153 and in a similar way, the operations of read of information and storage in file are sequentially performed.

If near memory full occurs in step S158 in the course of file creation, a page of an original placed on the original table 2 at that time in step S159 is scanned and compressed to create a file in step S160. For the reason described above, file creation of the image information of one page following generation of near memory full is not failed to be performed.

Subsequently, operation is advanced to step S161, a message of print ahead of others due to memory full is displayed on the indicator 116 and printing is then executed based on image information thus far stored in the file area M2 of the page memory 323 to open the file area of the page memory 323. As a result, a near memory full state is released and whereby processing is again returned back to step S153 and a copy operation is restarted to be continued on residual original pages on ADF 200.

In a functional block diagram shown in FIG. 7, while page buffers are generally inserted between an original read control section/enlargement/reduction section 351 and image compression control section 352, and between image expansion control section/development position control section 354 and image print control section 355, simplification of a structure has been practiced by adoption of a commonly used page buffer. While even when memory full is generated in such a structure and the image information which is formed in the original read control section/enlargement/reduction section 351 and compressed in the image compression control section 352 can not be processed so as to create a file in the file management control section 353, printing is started, the image information of the last page scanned before the memory full generation, which is not subjected to file creation, has to be deleted from the page buffer for this reason. As a result, in order to continue the job, an original already fed at that point is returned and scanning has to be started at the preceding original page from the first portion of its particular process by the scanner 313.

However, as shown in a flow chart of FIG. 21, according to an image forming apparatus of the present invention, an original already fed is not required to be returned at a time when near memory full generates, a job is continued to run and whereby operability is very good.

In the case of a completion type copy operation employing the above-mentioned function, a job is continued to run without an original return operation. A flow of operation in this processing can be conducted in a similar manner to FIG. 21. That is, a compressed image information, which is already read, and which is not stored in a file storage area, is stored in the file area M2 of the page memory 323 without discontinuance, a page buffer memory, which has been used for inputting of image information, is used for printing, the printing of a predetermined number of all the copies is all at one time in a successive manner conducted based on image information stored in the file area M2 of the page memory 323 and all the image information are deleted at one time after the printing is over to open a storage area.

An original return operation is not necessary and a job can be continued with good operability by continuing an original inputting and use of the released storage area.

In a copy operation of a conventional sequential type, if it is detected that an original is present on ADF and if print paper can be fed even when read and file creating is not completed, a copy speed can be increased. However, if file creating is not completed at that time due to memory full, image information, which is input, and whose file creating is completed, is subjected to printing for a predetermined number of copies and thereafter all the image information, which has all been processed for creation of a file, is deleted, so that a job is continued in order to clear off memory full after print paper, which has been fed, are printed. For this reason, in a sequential type, since the image information of the last page for the second copy and the following copies are already deleted, the last page cannot be printed for the copies except for the first copy and after all, one original page has to be again subjected to normal inputting.

In contrast to this, since the present invention adopts a near memory full method, originals already fed can be subjected to file creating and are not necessary to be returned and whereby a job can be continued without a drop in a copy operation speed.

Figure 22:
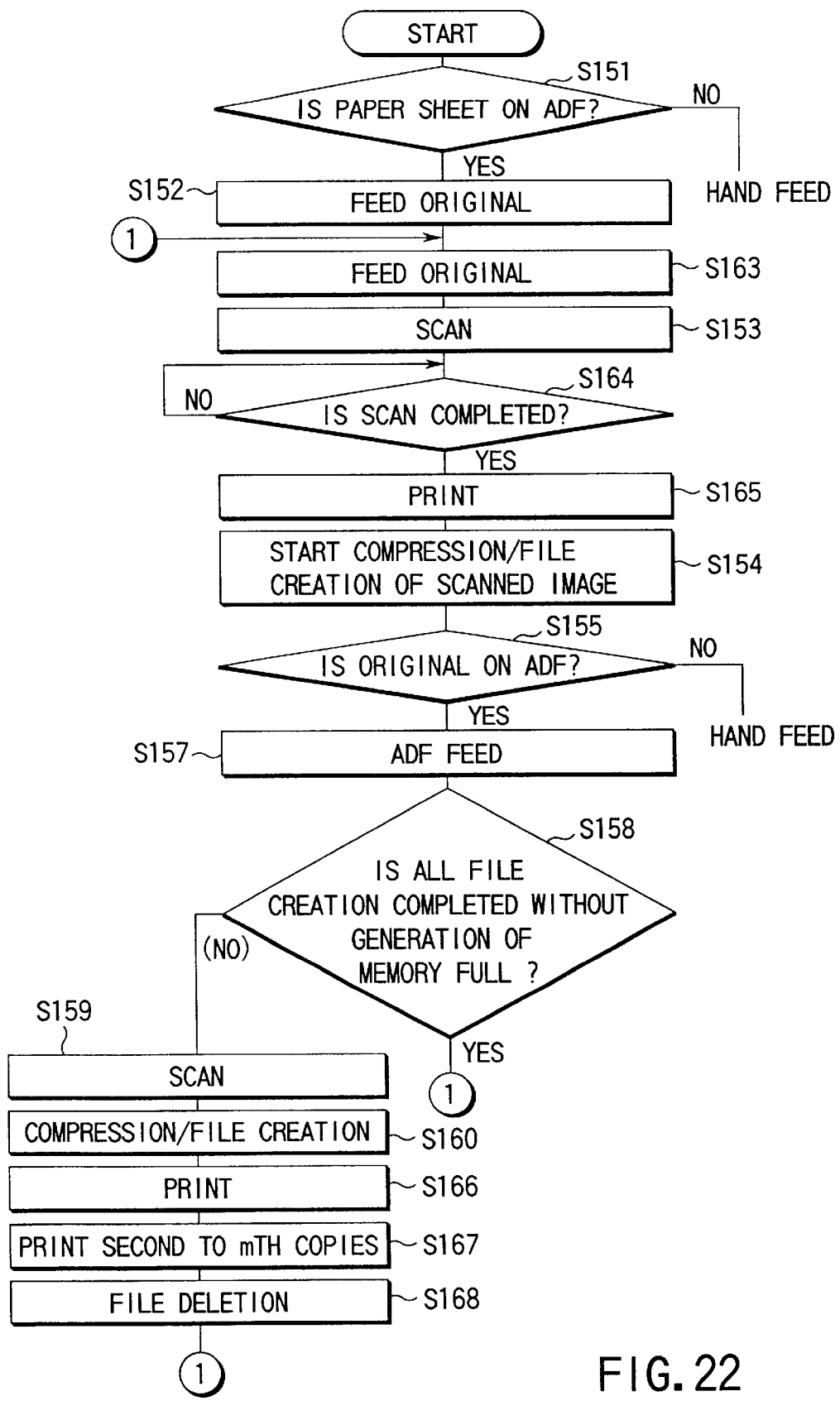
FIG. 22 is a flow chart showing an operation performed when memory-full occurs in a sort copying mode.

FIG. 22 shows a flow chart in the case where an original which comprises n pages is copied to m copies in a sequential sort mode. This flow chart is basically same as a copy flow shown in FIG. 21 and the same parts are indicated by the same step numbers and description on the same parts is omitted.

In a copying of a first copy in the case of a sequential type sort, when an original is fed in step S152, copy paper sheets are fed for printing and thereafter, a scan operation is conducted in step S153 to produce image information of the original. If it is detected that the scan operation is completed in step S164, printing is performed based on the produced image information in step S165 and simultaneously the image information produced in step S154 is subjected to compression and file creating processing.

In the following operations, operations of read of image information for each page and printing based on the image information for a first copy are sequentially repeated in steps from S163 to S158.

If near memory full state is generated half way in the course in which read of each page of the image information for a first copy and printing based thereon are repeated, a scan operation and a compression/file create operation for an original page which is already fed at that time are conducted in steps S159 and S160 and printing of the original is conducted in step S166.

Subsequently, printing of second through mth copies of the original is sequentially conducted using the image information including all the original page which is already fetched and finally all the files are deleted.

While in the above mentioned descriptions, switching of a delete timing for the image information and switching of a job running state, switching of stored memory full generation and the like, for example, according to whether or not the hard disk 90 as a large capacity storage device is mounted to an image apparatus, have been shown by contents in which actual executions are conducted, and furthermore, possibility levels of job concurrent operations can be switched according not only to whether or not a hard disk 90 but to a capacity of RAM.

Figure 23:
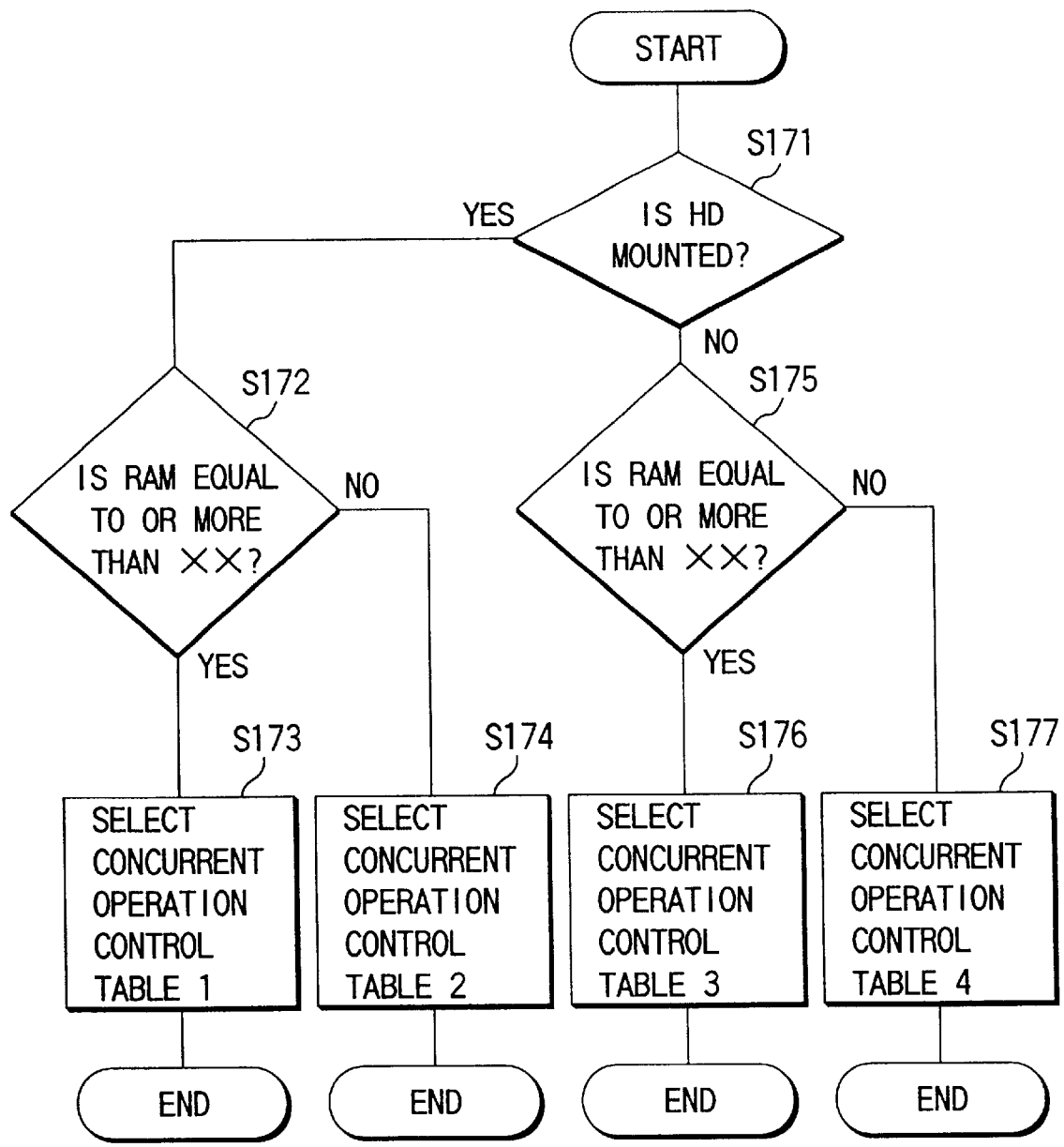
FIG. 23 is a flow chart representing a switching operation of possibility levels of job concurrent operation based on the presence or absence of a hard disk device and a capacity of an RAM thereof.

FIG. 23 is a flow chart showing an overall flow in level switching, and when power is applied to the image forming apparatus, it is first checked in S171 whether a hard disk 90 is mounted or not.

If the hard disk 90 is mounted, operation proceeds to step S172 and it is checked whether a page memory 323 which is RAM has a capacity equal to or larger than a predetermined value. If it is equal to or larger than the predetermined value, operation proceeds to step S173 and a concurrent operation control table 1, later described, is selected to terminate processing.

On the other hand, if it is found that the capacity of page memory 323 is smaller than the predetermined value, operation proceeds to step S174 and a concurrent operation table 2 is elected to terminate processing.

If it is detected in step S171 that the hard disk 90 is not mounted, operation proceeds to step S175 and it is checked whether or not the page memory which is RAM has a capacity equal to or larger than a predetermined value. If the capacity is larger than the predetermined value, operation proceeds to step S176 and a concurrent operation control table 3, later described, is selected to terminate processing. On the other hand, if the capacity is smaller than the predetermined value, operation proceeds to step S177 and a concurrent operation control table 4 is selected to terminate processing.

FIG. 24 is a table showing an example of constitution of the concurrent operation control table 3 in the case where a hard disk is not mounted and the capacity of RAM is 12 megabytes. Here, a mark X means that if there is a job in run, acceptance of a following job is prohibited and it sets such that the following job is not activated. A mark Δ means that the following job is accepted after the job in run is over, a mark ○ means that the job in run is immediately stopped and the following job is executed at the end of a page and the preceding job is restarted after the following job is over. The case of the mark ○ is a so-called interrupt operation.

In FIG. 23, if a hard disk device 90 is mounted, and a RAM capacity of the page memory 232 is, for example, 12 megabytes or larger; a control table 1 is selected, if the hard disk device 90 is mounted and the RAM capacity is, for example equal to or smaller than 12 megabytes, a control table 2 is selected; if the hard disk device 90 is not mounted and the RAM capacity is, for example, 8 megabytes or larger, a control table 3 is selected; and if the hard disk device 90 is not mounted and the RAM capacity is, for example, equal to or smaller than 8 megabytes, a control table 4 is selected. One of the control tables is selected according to the flow chart of FIG. 23 when power is applied.

There is described on an embodiment having a function in which selection is conducted on timing of a job switching such that whether a job is switched at a time when a job is completed or between pages based on the presence or absence of the hard disk device 90 and whether or not an RAM capacity is large or small.

Normally, a start of a job is performed by the following timing. That is, a start of copying is conducted by selection of a copy menu from an operator control panel 114 and push-down of a start key 121 thereafter. Input of FAX original is conducted by selection of FAX menu from the operator control panel and push-down of the start key 121 thereafter. In addition, interrupt copy is conducted by push-down of an interrupt key 133 and push-down of the start key from the operator control panel 114.

As generation of a job for switching, in FAX printing, generation of a print demand to a job management section inside the system after completion of reception in FAX communication is regarded as generation of a job, in a printer 315, generation of print demand to the job management inside the system after reception of one job from a printer I/F is regarded as generation of a job and in memory full printing, generation of print demand to the job management section inside the system when memory full generates during transmission and reception of FAX is regarded as generation of a job.

Figure 25:
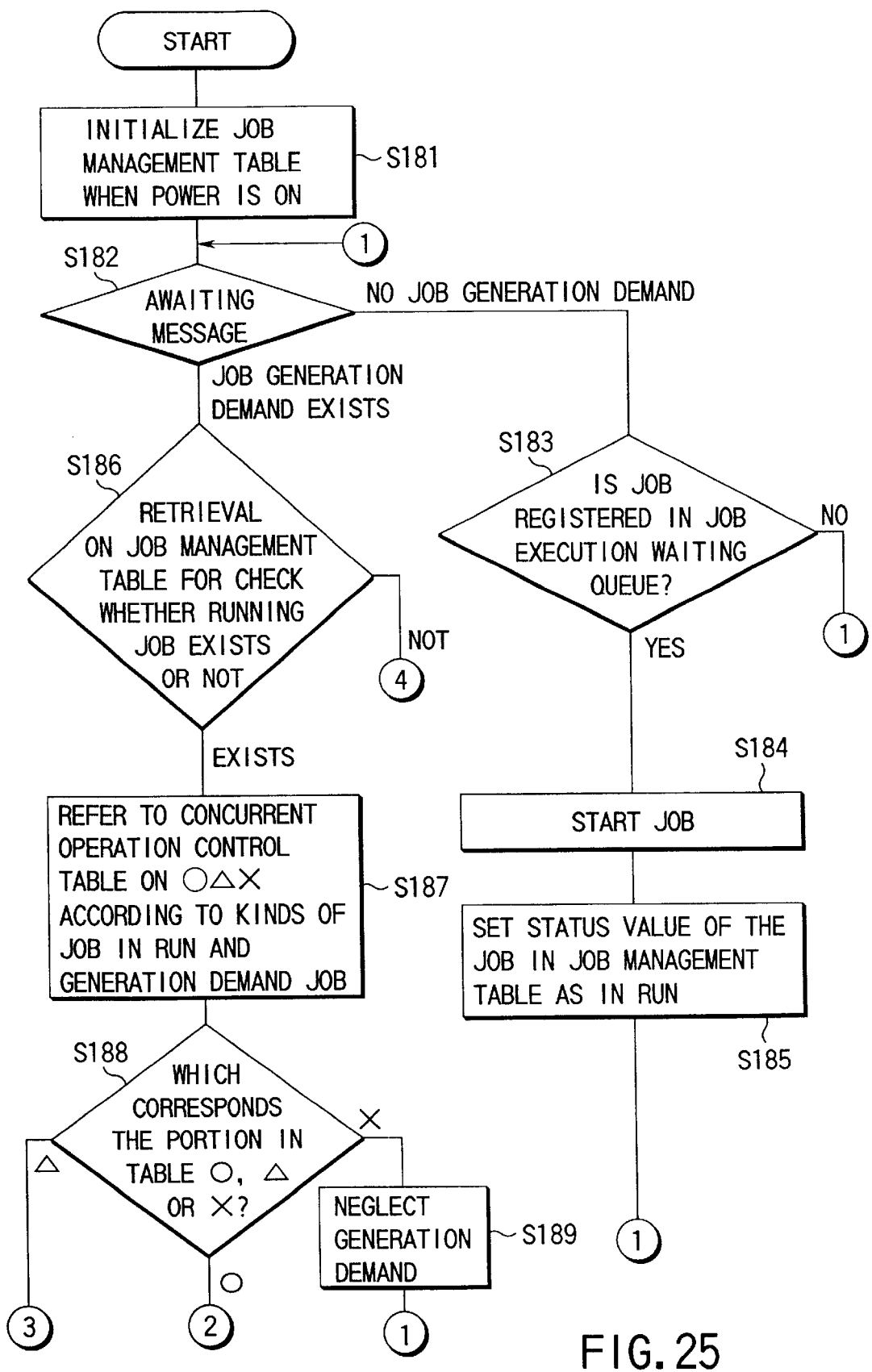
FIG. 25 is a flow chart showing an operation of a job managing section.
Figures 26, 27, 28:
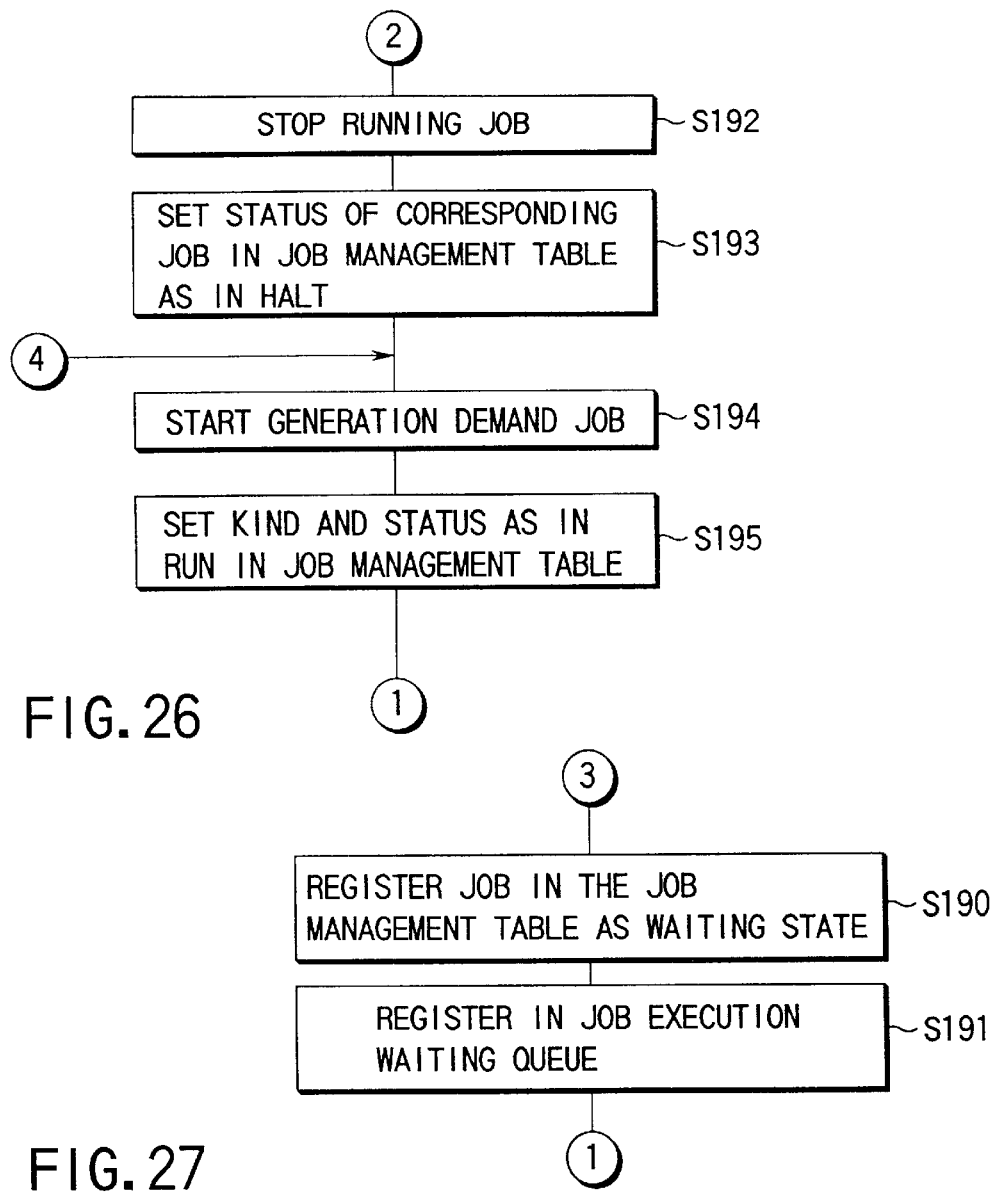
FIG. 26 is a flow chart showing an operation of a job managing section.
FIG. 27 is a flow chart showing an operation of a job managing section.
FIG. 28 is a representation showing a constitution of a job management table.

FIGS. 25 to 27 show operational flow charts of the job management section having functions mentioned above and FIG. 28 is a table showing an example of a constitution of a job management table.

First, in step S181 of FIG. 25, the job management table is initialized when power is applied and operation is advanced to step S182 to check whether or not there is a message demanding for generation of a job.

If no, operation is shifted to step S183 to check on whether or not a job is registered in execution waiting queue. If no, operation is shifted to step S182 to await registration of a job.

If a job is registered, operation is shifted to step S184 and a registered job is started. In step S185 a status value of the job is set as in-run in the job management table. For example, in FIG. 28, the case where the job in run is copying is shown and a generation time of the job is on record at 41 min past 10 o'clock.

When there is a generation of a job demand in step S182, operation is shifted to step S186 and at that time, the job management table of FIG. 28 is retrieved to check whether or not there is a job in run. Here, since a copy operation is in run, operation is advanced to step S187 and it is determined whether or not a job of generation demand is accepted in reference to one of the concurrent operation control tables 1 to 4 of FIG. 23, for example in reference to ○, Δ and X in the table of FIG. 24, from kinds of the job in run and a job of generation demand.

For example, if the job in run is copy 1 and the following job is FAX print in FIG. 24, since X is the corresponding part in the table, operation is shifted from step S188 to step S189, a generation demand is neglected and operation is returned to step S182.

If the following job is interrupt copy, since ○ is in the corresponding part in the table, operation is shifted to step S192 to stop the job in run. Thereafter, the status of the corresponding job is set in halt in step S194 among, for example, 200 statuses of the job management table of FIG. 28, a job of generation demand is started in step S194, a job kind and a status (in run) are set in the job management table in S195 and then operation is returned to S182.

If Δ is in the corresponding part in S188, operation is shifted to step S190 of FIG. 27, a job is registered in job management table for acceptance after the job in run is completed in step S191, a waiting state is set and then operation is returned to S182.

If a job in run is not present in S186 of FIG. 25, processing is shifted to S194 to start a job of generation demand.

If a switching demand for a different job is generated in running of a job in which image information like copy of FAX an original input is compressed and a file is created for the information and it is required to open the page buffer, and if image information which is lastly input cannot be stored due to memory full, there is required an operation that an original is returned and scanned for the second time, when the job is restarted after discontinuance in order to clear the page buffer.

Figure 20:
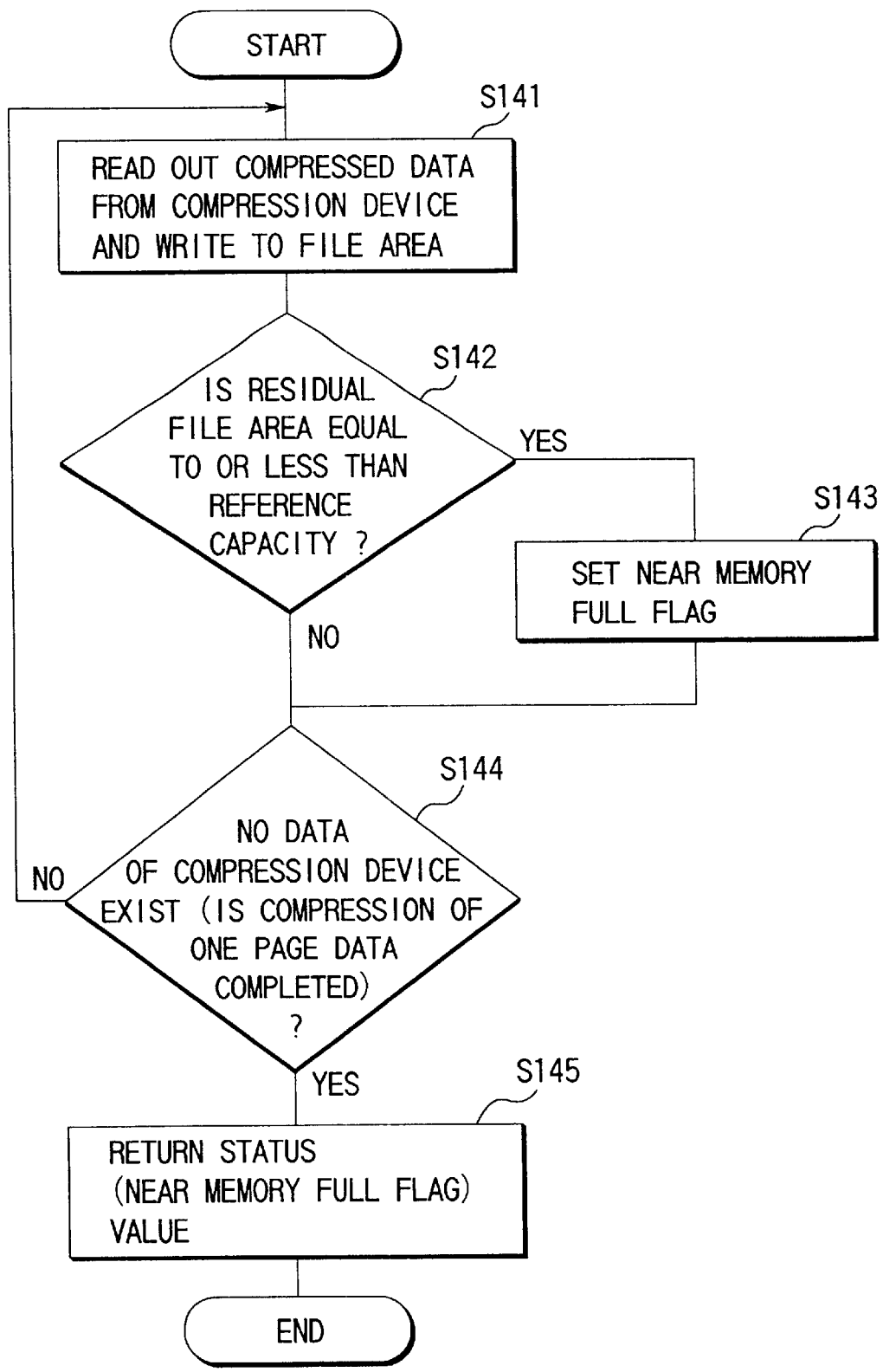
FIG. 20 is a flow chart of occurrence of memory-full in a write operation to a file.

In the embodiment, a control flow of a near memory full shown in FIG. 20 is utilized without any modification, whereby there is no necessity for operations that an original is returned for the second scanning when the job is restarted after discontinuance.

Figure 29:
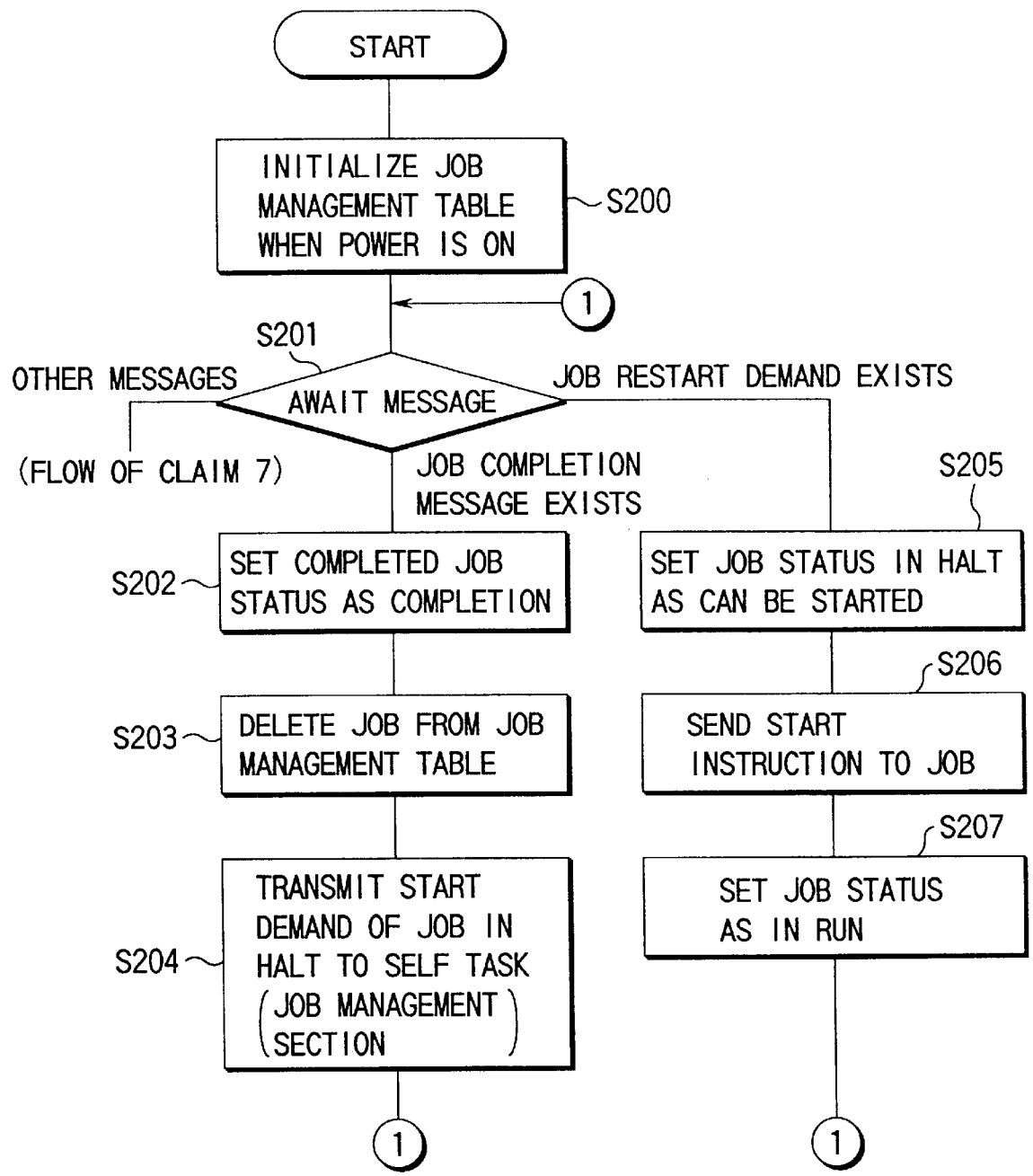
FIG. 29 is a flow chart showing an operation of a job switching operation.

FIG. 29 shows a flow chart for illustrating an operation of the embodiment and first, a job management table is initialized in step S200 when power is applied. A message of job generation demand is awaited in this condition in step S201.

Messages comprise a job restart demand message, job completion message and other messages.

In the case of the job completion message, a state of a completed job is set as completion in step S202, the job is deleted from the job management table in step S203, a start demand for a job in halt is transmitted to a job management section for self task in S204.

When the job restart demand message is present, a state of a job in halt is set as can be started in step S205, a start instruction is sent to the. job in S206 and a state of the job is set as in run in S207. In either of the cases of S204 and S207, operations are returned to S204 which is a step where a message is awaited after the steps S204 and S207.

When one of the other messages is received in S201, the message is regarded as a following message and controlling for switching timing is conducted according to respective contents. Besides, as other embodiments of the present invention, there are available functions such that a registration operation of an image to an image storage area can be executed and a countermeasure is taken such that there is prevented registration failure caused by memory full in registration for improvement on an edit output performance. This is achieved by providing in advance image area partitions of the number of registrations×the maximum size.

Figure 30:
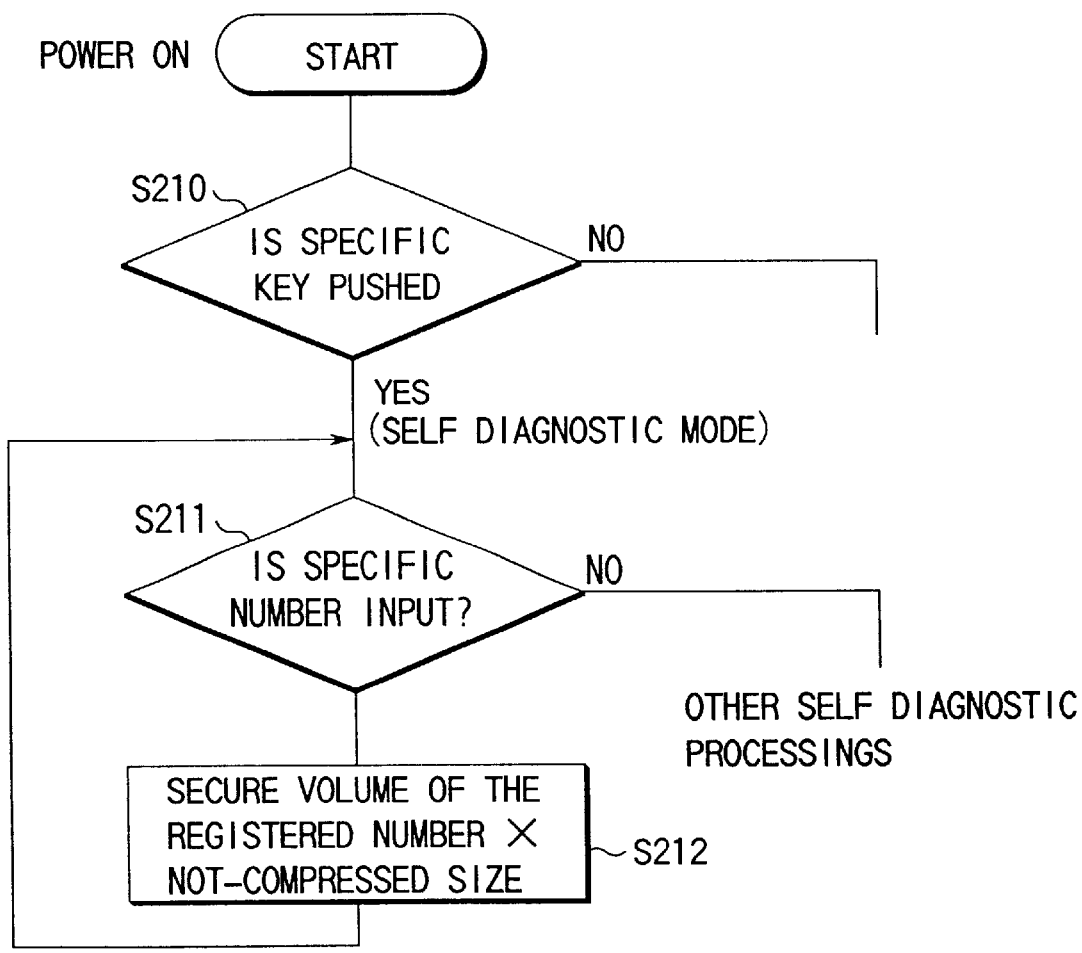
FIG. 30 is a flow chart of volume control for a hard disk device.

FIG. 30 shows a flow chart for illustrating operations of this embodiment, a volume set operation of the hard disk device 90 is conducted in a self diagnostic set mode and initialization is conducted when the hard disk device 90 is mounted.

In FIG. 30, check is conducted on whether or not a specific key is pushed down in the first step S210. If the specific key is not pushed down, a normal start operation is conducted.

If a specific key is pushed down, a self diagnostic mode is set and it is checked whether or not a specific number is input in step S211. If no specific number is input, a different diagnostic operation is conducted other than the self diagnostic operation for the hard disk device 90 and if a specific number is input, an operation to secure volume of the registration number×A3 not compressed size is conducted in step S212.

An image is not failed to be registered without generation of memory full by writing a registered image information in the volume thus secured.

As a volume to be secured, the volume is not necessary the registration number×A3 not compressed size and if a larger volume of the registration number×the maximum size×2 (or 4) is secured, image registration can be made with higher certainty.

In the case where registered image and paper are respectively different from a synthesized image and paper in orientation (for example A4 vs. A4-R), image information once registered is requested to be rotated on a work memory and synthesized to be printed. Since printing is slowed for this reason, images which are respectively rotated in advance such images rotated by 90 degrees, 180 degrees and 270 degrees or an image rotated by 90 degrees only is registered in order to avoid such circumstances.

Figure 31:
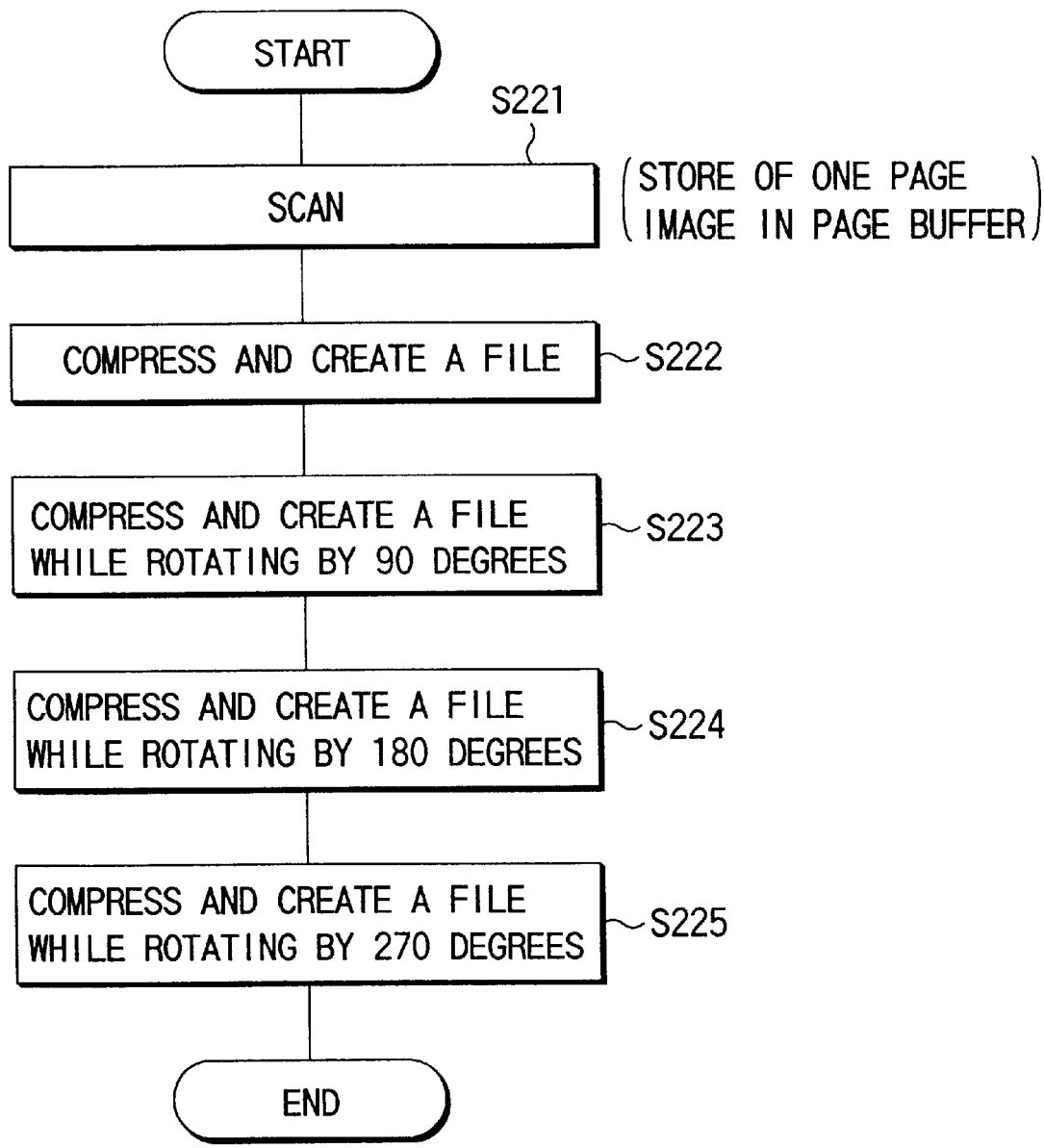
FIG. 31 is a flow chart showing an operation of registering image rotation.

That is, as shown in a flow chart of an original input task of FIG. 31, an original is first scanned in step S221 and the image information of one page is then stored in the page buffer 323.

In step S222, which is next in order, the stored image information is compressed and a file is created, and in step S223, the image information is further compressed while being rotated by 90 degrees and a file is created. If necessary, in step S224, the image information is further compressed while being rotated by 180 degrees and a file is created, and still further in step S225, the image information is compressed while being rotated by 270 degrees and a file is created. A print process is performed in a fast manner by registering the image information which is respectively rotated by 90 degrees, 180 degrees and 270 degrees, or only by 90 degrees.

Figure 32:
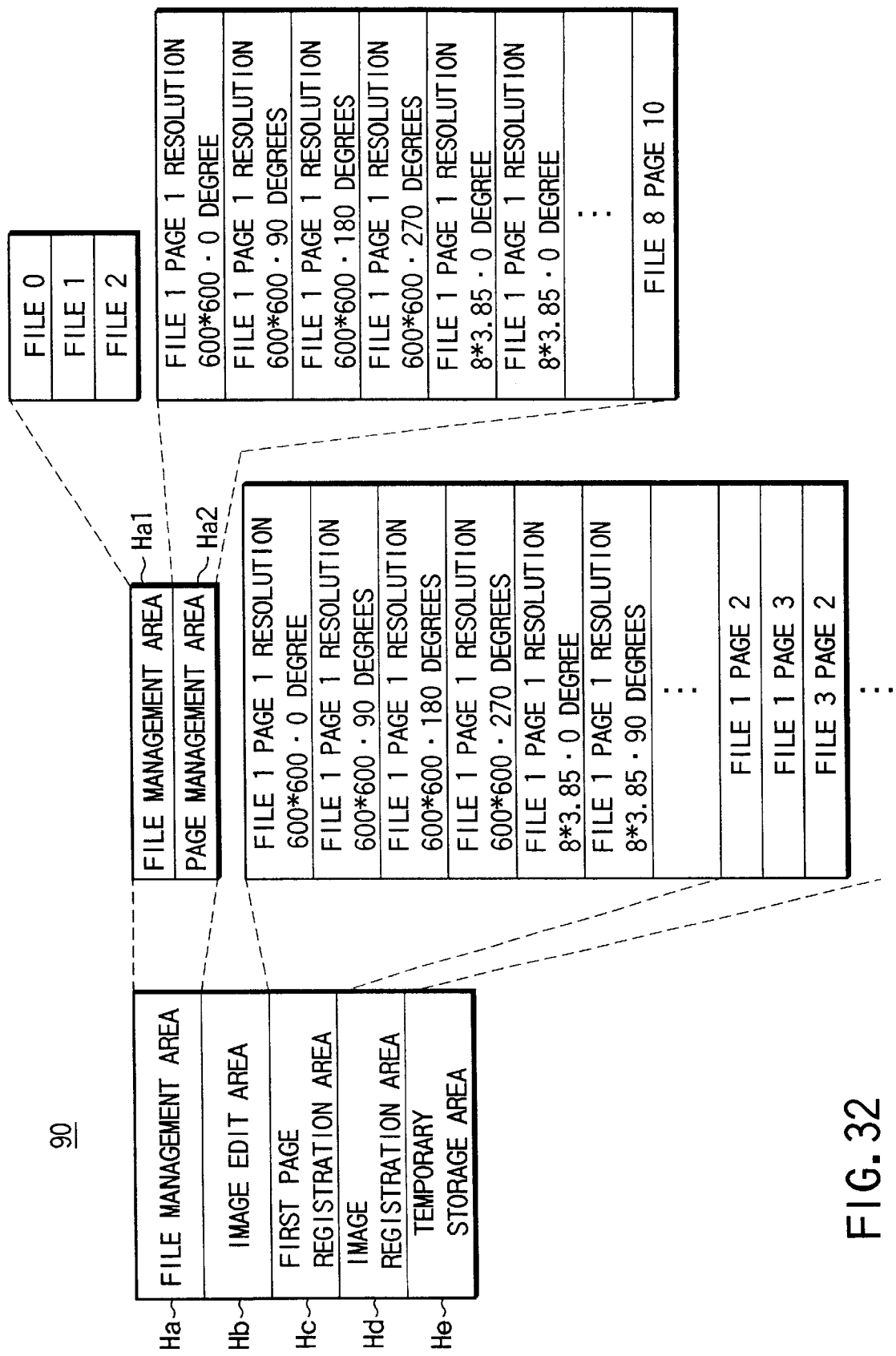
FIG. 32 is a view showing a hierarchical structure of storage areas of a hard disk device.

FIG. 32 shows an example of divisional management of a storage area of the hard disk device 90 for use in such image registration and the whole storage area is divided into a file management area Ha, image edit area Hb, first page registration area Hc, image registration area Hd and temporary retention area He.

The file management area Ha is further divided into a file management area Ha1 and page management area Ha2 and the file management area Ha1 is still further divided into a file 0, file 1, file 2 . . .

In the page management area Ha2, scanning or image processing is repeated in a plurality of times to convert the image to those of all the resolutions which the device can output and store the images of the number of resolutions. Besides, the image of each resolution is further converted to orientations rotated by 0 degree, 90 degrees, 180 degrees and 270 degrees and those images are stored in the page management area.

In a similar way, the first page registration area Hc is divided into a plurality of areas which have different combinations of respective resolutions and image orientations. A capacity of the first registration area Hc to be secured is a magnitude such that satisfies [the number of pixels of the maximum size×the number of lines of the maximum size×4 rotations×the number of files in which an image can be registered]. Raw information is stored without compression by encoding in the first page registration. The image information to be stored in the image registration area Hd is stored after compression.

According to an embodiment of the present invention, only a first page in a normal condition or in restart after discontinuance can be printed directly from an input page so as to have the first page to be printed in a first manner in a mode in which input and printing are concurrently run.

Figure 33:
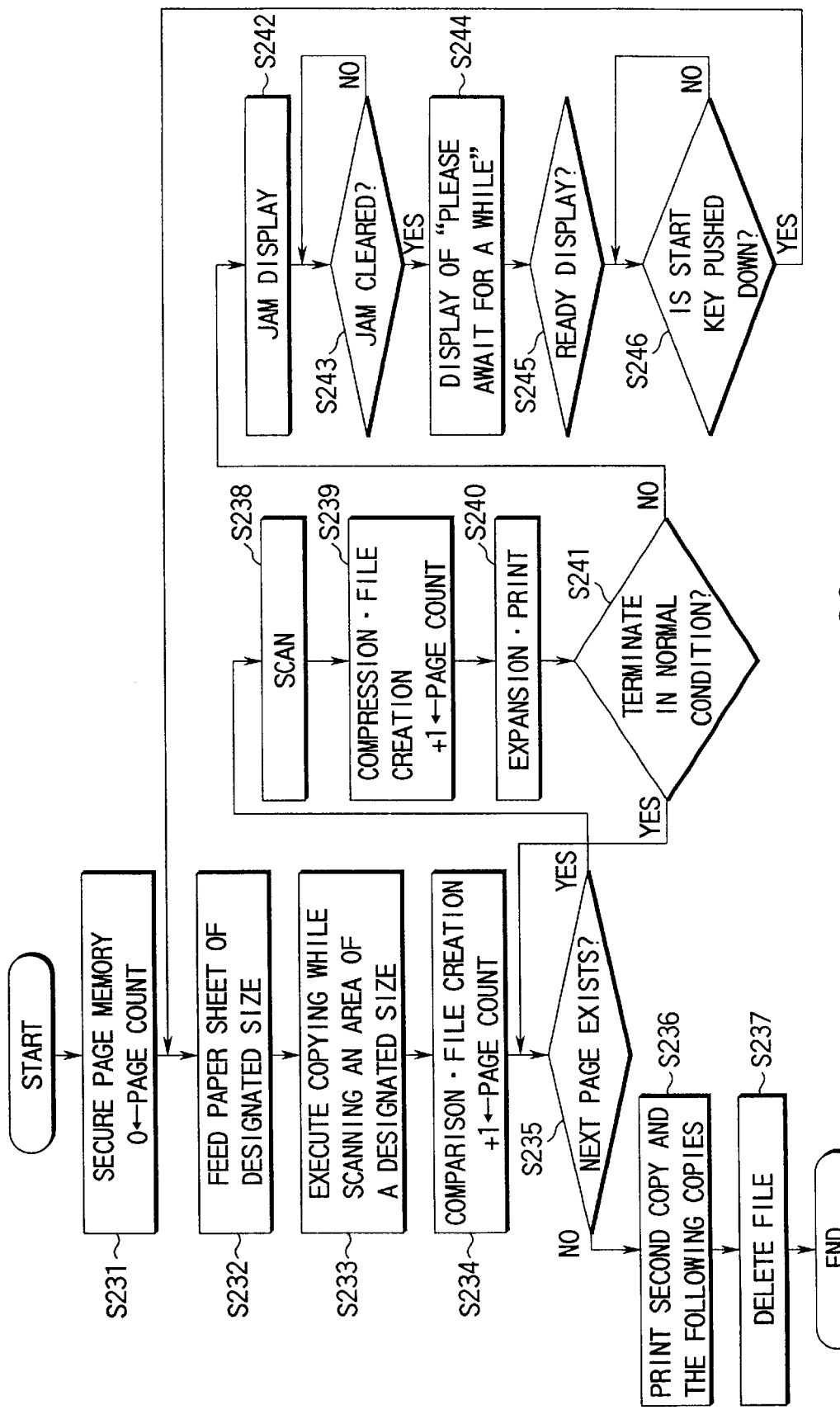
FIG. 33 is a flow chart showing an operation of direct printing of a first page in a normal condition or at restart after discontinuance of an operation.

FIG. 33 shows an outline of operation in this mode and in particular shows an outline of operation in direct printing of a first page in a normal condition and in restart after discontinuance due to jam.

In FIG. 33, it is considered the following case where first, an electric sort mode as an operational mode is set by a user, an original is set and a start key, that is a copy key, is pushed down in a condition in which the number of prints is predetermined.

With such preceding operation, a page memory is secured in step S231 and a page count is set as 0. From this state, operation is shifted to step S232, which comes next, and paper sheets of a designated size are supplied.

Subsequently, in step S233, an area of a predetermined size in an original is scanned when a paper sheet reaches a predetermined position and printing for copying is immediately executed by using the image information read, and at the same time the image information read in step S234 is in parallel compressed and a file is created and the page count is added with [1].

Subsequently, in step S235, it is checked on whether or not next original is present and if no, printing of a second copy and the following copies are performed in step S236 and if the last of copies of the predetermined number is printed, the file of the original is deleted in step S237 to terminate the whole operation.

If next an original is present in step S235, the original is scanned in step S238, the image information is compressed and a file is created in step S239, a value of the page count is increased by [1]. Subsequently, the image information in a file is read, expanded and printed in step S240.

In such a manner, it is checked in step S241 on whether or not printing of the page is performed normally, if yes, operation is returned to step S235 and operation on another next original is continued in a similar way.

As a result in checking in step S241, if a jam occurs, a jam display is displayed in step S242. At this point, it is detected on what ordinal number of page the jam occurred and a value of the page count is reduced by the number of jam occurrences.

Then it is checked on whether or not the jam is cleared and if yes, a message of "please await for a while" is displayed in step S244, it is further checked on whether or not a restart preparation for a copy operation is completed in the whole of the image forming apparatus following a jam clear operation by a user and if yes, [ready] is displayed in step S245.

Thereafter, a check is conducted in step S246 on whether or not a start key is pushed down by the user and if yes, operation is returned to step S232 and a copy operation is restarted. In company with the restart of this copy operation, only a first page after the restart is immediately printed in step S233.

In such a manner, in the case where input and printing of an image are concurrently performed, since a first page in a normal condition and in restart after discontinuance due to a jam is printed in a fast manner, a user can confirm a printing condition immediately after start or restart and thereby image forming can be performed with a high operational speed and excellent operability.

According to the present invention, as described in detail above, a high processing speed is maintained, though with an increased storage capacity by use of a large capacity storage device such as a hard disk; an image already read is advantageously used without deletion thereof even when memory full occurs half way in the course of image inputting, paper jam occurs or a different job is accepted as interruption; and a first page is printed in a fast manner in a normal condition and in restart after discontinuance due to an interruption or a jam when input and printing are concurrently operated, whereby an image forming apparatus with high operational speed and excellent operability can be provided.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:

reading means for reading image information of an original;

storage means for storing the image information read in the read means;

deciding means for deciding on whether an access speed of the storage means is small or large;

setting means for setting a first image forming mode if the access speed of the storage means is small, or setting a second image forming mode if the access speed of the storage means is large, based on the deciding means;

selecting means for selecting one of the first and second image forming modes set by the setting means according to a decision by the deciding means;

image forming means for forming an image on an image forming medium from the image information stored in the storage means in a selected image forming mode according to an output of the selecting means, wherein the image forming means comprises deleting means for deleting page image information from the storage means each time when a page image is formed, if the first image forming mode is selected, p1 wherein the image forming means comprises, in order to execute a first sort mode:

means for sequentially producing a first copy and following plurality of copies of the original by sequentially reading all the pages of the original stored in the storage means to form an image on the image forming medium; and means for sequentially deleting image information of each page of the original from the storage means each time when print operation of the page is finished in the course where pages of the last copy of the predetermined number of the original are produced.

2. An image forming apparatus comprising:

reading means for reading image information of an original;

storage means for storing the image information read in the read means;

deciding means for deciding on whether an access speed of the storage means is small or large;

setting means for setting a first image forming mode if the access speed of the storage means is small, or setting a second image forming mode if the access speed of the storage means is large, based on the deciding means;

selecting means for selecting one of the first and second image forming modes set by the setting means according to a decision by the deciding means;

image forming means for forming an image on an image forming medium from the image information stored in the storage means in a selected image forming mode according to an output of the selecting means, wherein the image forming means comprises deleting means for deleting page image information from the storage means each time when a page image is formed, if the first image forming mode is selected, wherein the image forming means comprises, in order to execute a second sort mode:

means for sequentially producing not only a first copy of the original but the following rest of the predetermined number of copies thereof by sequentially reading all the pages of the original stored in the storage means to form an image on the image forming medium; and means for deleting image information of all the page of the original in a lump from the storage means when print operation of all the pages of the last copy of the predetermined number of the original is finished.

3. An image forming apparatus comprising:

reading means for reading image information of an original;

storage means for storing the image information read in the read means;

deciding means for deciding on whether an access speed of the storage means is small or large;

setting means for setting a first image forming mode if the access speed of the storage means is small, or setting a second image forming mode if the access speed of the storage means is large, based on the deciding means;

selecting means for selecting one of the first and second image forming modes set by the setting means according to a decision by the deciding means;

image forming means for forming an image on an image forming medium from the image information stored in the storage means in a selected image forming mode according to an output of the selecting means, wherein the image forming means comprises deleting means for deleting page image information from the storage means each time when a page image is formed, if the first image forming mode is selected, wherein the image forming means comprises, in order to execute a second sort mode:

means for sequentially producing not only a first copy of the original but the following rest of the predetermined number of copies thereof by sequentially reading all the pages of the original stored in the storage means to form an image on the image forming medium;

means for deleting image information of all the page of the original in a lump from the storage means when print operation of all the pages of the last copy of the predetermined number of the original is finished, wherein the means for deleting in a lump comprises means for deleting image information of all the pages in a lump from the storage means after the image information of the last page of the past copy of the original is down loaded to a storage device for printing.

4. An image forming apparatus comprising:

reading means for reading image information of an original;

storage means for storing the image information read in the read means;

deciding means for deciding on whether an access speed of the storage means is small or large;

setting means for setting a first image forming mode if the access speed of the storage means is small, or setting a second image forming mode if the access speed of the storage means is large, based on the deciding means;

selecting means for selecting one of the first and second image forming modes set by the setting means according to a decision by the deciding means;

image forming means for forming an image on an image forming medium from the image information stored in the storage means in a selected image forming mode according to an output of the selecting means, wherein the image forming means comprises deleting means for deleting page image information from the storage means each time when a page image is formed, if the first image forming mode is selected, wherein the image forming means comprises, in order to execute a first sort mode:
  means for sequentially producing a first copy and following plurality of copies of the original by sequentially reading all the pages of the original stored in the storage means to form an image on the image forming medium; and
  means for sequentially deleting image information of each page of the original from the storage means each time when print operation of the page is finished in the course where pages of the last copy of the predetermined number of the original are produced.

5. An image forming apparatus comprising:
reading means for reading image information of an original;
storage means for storing the image information read in the read means;
deciding means for deciding on whether an access speed of the storage means is small or large;
setting means for setting a first image forming mode if the access speed of the storage means is small, or setting a second image forming mode if the access speed of the storage means is large, based on the deciding means;
selecting means for selecting one of the first and second image forming modes set by the setting means according to a decision by the deciding means;
image forming means for forming an image on an image forming medium from the image information stored in the storage means in a selected image forming mode according to an output of the selecting means, wherein the image forming means comprises deleting means for deleting page image information from the storage means each time when a page image is formed, if the first image forming mode is selected,
wherein the image forming means comprises, in order to execute a first sort mode:
  means for sequentially producing a first copy and following plurality of copies of the original by sequentially reading all the pages of the original stored in the storage means to form an image on the image forming medium;
  means for sequentially deleting image information of each page of the original from the storage means each time when print operation of the page is finished in the course where pages of the last copy of the predetermined number of the original are produced,
  wherein means for sequentially deleting comprises means for deleting the image information of each page of the original from the storage means after the image information of the page is down loaded to a storage device for printing.

6. An image forming apparatus comprising:
reading means for reading image information of an original;
storage means for storing the image information read in the read means;
deciding means for deciding on whether an access speed of the storage means is small or large;
setting means for setting a first image forming mode if the access speed of the storage means is small, or setting a second image forming mode if the access speed of the storage means is large, based on the deciding means;
selecting means for selecting one of the first and second image forming modes set by the setting means according to a decision by the deciding means;
image forming means for forming an image on an image forming medium from the image information stored in the storage means in a selected image forming mode according to an output of the selecting means, wherein the image forming means comprises deleting means for deleting page image information from the storage means each time when a page image is formed, if the first image forming mode is selected,
wherein the image forming means comprises, in order to execute a second sort mode:
  means for sequentially producing not only a first copy of the original but the following rest of the predetermined number of copies thereof by sequentially reading all the pages of the original stored in the storage means to form an image on the image forming medium; and
  means for deleting image information of all the pages of the original in a lump from the storage means when print operation of all the pages of the last copy of the predetermined number of the original is finished.

7. An image forming apparatus comprising:
reading means for reading image information of an original;
storage means for storing the image information read in the read means;
deciding means for deciding on whether an access speed of the storage means is small or large;
setting means for setting a first image forming mode if the access speed of the storage means is small, or setting a second image forming mode if the access speed of the storage means is large, based on the deciding means;
selecting means for selecting one of the first and second image forming modes set by the setting means according to a decision by the deciding means;
image forming means for forming an image on an image forming medium from the image information stored in the storage means in a selected image forming mode according to an output of the selecting means, wherein the image forming means comprises deleting means for deleting page image information from the storage means each time when a page image is formed, if the first image forming mode is selected,
wherein the image forming means comprises, in order to execute a second sort mode:
  means for sequentially producing not only a first copy of the original but the following rest of the predetermined number of copies thereof by sequentially reading all the pages of the original stored in the storage means to form an image on the image forming medium;
  means for deleting image information of all the pages of the original in a lump from the storage means when print operation of all the pages of the last copy of the predetermined number of the original is finished,
  wherein the means for deleting in a lump comprises means for deleting image information of all the pages in a lump from the storage means after the image information of the last page of the last copy of the original is down loaded to a storage device for printing.

8. An image forming apparatus comprising:
read means for reading image information of an original;
storage means for storing the image information read by the read means;

deciding means for deciding on whether an access speed of the storage means is small or large;

setting means for setting an image forming condition including a first sort mode if the access speed of the storage means is small, or a second sort mode if the access speed of the storage means is large, as a sort mode in which binding is carried out for each copy of the original in forming an image on an image forming medium from the image information stored in the storage means;

selecting means for selecting one of the first and second sort modes set in the setting means according to an output signal of the generating means; and image forming means for forming an image on the image forming medium from the image forming stored in the storage means based on the image forming condition including a sort mode selected according to an output of the selecting means, wherein the image forming means comprises deleting means for deleting page image information from the storage means each time when a page image is formed, if the first sort mode is selected.

9. An image forming apparatus according to claim 8, wherein the image forming means comprises, in order to execute a first sort mode:

means for sequentially producing a first copy and the following plurality of copies of the original by sequentially reading all the pages of the original stored in the storage means to form an image on the image forming medium; and means for sequentially deleting image information of each page of the original from the storage means each time when print operation of the page is finished in the course where pages of the last copy of the predetermined number of the original are produced.

10. An image forming apparatus according to claim 8, wherein the image forming means comprises, in order to execute a second sort mode:

means for sequentially producing not only a first copy of the original but the following rest of the predetermined number of copies thereof by sequentially reading all the pages of the original stored in the storage means to form an image on the image forming medium; and means for deleting image information of all the pages of the original in a lump from the storage means when print operation of all the pages of the last copy of the predetermined number of the original is finished.

11. An image forming apparatus according to claim 10, wherein the means for deleting in a lump comprises means for deleting image information of all the pages in a lump from the storage means after the image information of the last page of the last copy of the original is down loaded to a storage device for printing.

12. An image forming apparatus comprising:

read means for reading image information of an original;

storage means for storing the image information read by the read means;

generating means for generating a signal showing whether the storage means has a large access speed or a small one;

setting means for setting an image forming condition including a first sort mode if the access speed of the storage means is small, or a second sort mode if the access speed of the storage means is large, as a sort mode in which binding is carried out for each copy of the original in forming an image on an image forming medium from the image information stored in the storage means;

selecting means for selecting one of the first and second sort modes as a running state of an image forming condition set by the setting means according to an output of the generating means; and image forming means for forming an image on the image forming medium from the image information stored in the storage means based on the image forming condition including a sort mode selected according to an output of the selecting means.

13. An image forming apparatus according to claim 12, wherein the image forming means comprises, in order to execute a first sort mode:

means for sequentially producing a first copy and the following plurality of copies of the original by sequentially reading all the pages of the original stored in the storage means to form an image on the image forming medium; and means for sequentially deleting image information of each page of the original from the storage means each time when print operation of the page is finished in the course where pages of the last copy of the predetermined number of the original are produced.

14. An image forming apparatus according to claim 12, wherein the image forming means comprises, in order to execute a second sort mode:

means for sequentially producing a first copy of the original by sequentially forming images on image forming media according to image information of one page stored in the storage means each time when image information of the one page is stored in the storage means; and means for sequentially producing a predetermined number of copies of the original including the first copy by sequentially reading image information of all the pages thereof stored in the storage means.

15. An image forming apparatus comprising:

read means for reading image information of an original;

storage means for storing the image information read by the read means;

setting means for setting execution of image forming in either a group mode in which formation of an image on an image forming medium from the image information stored in the storage means is conducted so as to produce a predetermined number of copies for each page of the original or a sort mode in which formation of an image on an image forming medium from the image information stored in the storage means is conducted so as to carry out binding for each copy of the original;

first selecting means for selecting, as a running state of image formation set in the setting mode, either the group mode or the sort mode;

second selecting means for selecting as a running state of the selected group mode according to an output of the first selecting means either a first deletion mode in which the image information of each original page is deleted from the storage means each time when image formation of the predetermined number of copies for the original page is finished or a second deletion mode in which the image information of all the original pages is in a lump deleted from the storage means when image formation of the predetermined number of copies respectively for all the pages is finished; and deletion means for effecting the deletion in a lump after the image formation is executed in the sort mode if the second deletion mode is selected.

16. An image forming apparatus comprising:

read means for reading image information of an original;

storage means for storing the image information read by the read means;

generating means for generating a type signal showing whether the storage means is of a first type which has a small storage capacity or of a second type which has a large capacity;

first detecting means for detecting that an unused area of the storage means is equal to or less than a first threshold value if the storage means is of the first type based on the type signal;

second detecting means for detecting that an unused area of the storage means is equal to or less than a second threshold value larger than the first threshold value if the storage means is of the second type based on the type signal;

effecting means for effecting a memory-full operation on the storage means according to an detection signal from the first or second detecting means; and image forming means for forming an image on an image forming medium from the image information stored in the storage means.

17. An image forming apparatus according to claim 16, wherein the first threshold value is a value corresponding to a compressed information of image information of one page stored in a page buffer.

18. An image forming apparatus according to claim 16, wherein the second threshold value is a value corresponding to a compressed information of image information of the maximum size to be stored in a page buffer.

19. An image forming apparatus comprising:

read means for reading image information of an original;

compressing means for compressing the read image information;

storage means for storing the compressed image information in a file;

effecting means for effecting a memory-full operation when a residual storage capacity of the storage means is at least equal to or less than a threshold value at which the image information, in which a page image of the maximum size readable by the read means is compressed in a file, can be stored;

effecting means for effecting the memory-full operation on the storage means when the memory-full occurs;

executing means for executing a read operation of the original, and compression of and file creation for the read image information of the original set on the read means when the memory-full operation is effected; and image forming means for forming an image on an image forming medium based on the image information stored in a file in the storage means.

20. An image forming apparatus according to claim 19, wherein the image forming means comprises: adding means for adding a message of print due to memory-full to the image when an image is formed based on image information read after the memory-full operation; and erase means for erasing the image information after printing of the image with the message is finished.

21. An image forming apparatus comprising:

read means for reading image information of an original;

storage means for storing the image information read by the read means;

first detecting means for detecting whether or not a first storage device which has a large capacity and a small access speed as a storage means is included;

second detecting means for detecting whether or not a second storage device which has a large access speed and a storage capacity equal to or more than a predetermined value is included; control means comprising a concurrent operation control table for controlling switching between a job in run and a following job and contents of the concurrent operations based on a detection result of the first and second detecting means; and running means for running a predetermined job under control by the control means.

22. An image forming apparatus according to claim 21, wherein the image forming apparatus further comprises setting means for setting switch timing between a job in run and the following job according to contents of the job in run and the following job.

23. An image forming apparatus according to claim 21, wherein the image forming apparatus further comprises deciding means for deciding a job to be executed in reference to the concurrent operation control table based on a detection result of the first and second detecting means when power is applied to the apparatus.

24. An image forming apparatus according to claim 21, wherein the image forming apparatus further comprises effecting means for effecting read, compression and file creating of an image input lastly in the job in run when the job in run is switched to the following job.

25. An image forming apparatus comprising:

read means for reading image information of an original;

storage means for storing the image information read by the read means;

detecting means for detecting mounting a large capacity storage apparatus which has a small access speed as the storage means;

setting means for setting a self-diagnostic mode of the large capacity storage devise when power is applied;

securing means for securing a volume of a predetermined quantity in the interior of the large capacity storage device if a specific command is given in a condition set in a self-diagnostic mode;

volume storage means for storing the image information in the volume; and image forming means for forming an image on the image forming medium based on the image information stored in the volume under a predetermined image forming condition.

26. An image forming apparatus comprising:

read means for reading image information of an original;

storage means for storing the image information read by the read means;

first file creating means for creating a file in a compressed condition for the image information stored in the storage means;

second file creating means for creating a file for the image information stored in the storage means in a condition of being compressed and rotated by 90 degrees;

third file creating means for creating a file for the image information stored in the storage means in a condition of being compressed and rotated by 180 degrees;

fourth file creating means for creating a file for the image information stored in the storage means in a condition of being compressed and rotated by 270 degrees; and image forming means for forming an image on the image forming medium based on the image information stored in a file under a predetermined image forming condition.

27. An image forming apparatus comprises:

read means for reading image information of an original;

storage means for storing the image information read by the read means;

deciding means for deciding whether an access speed of the storage means is small or large;

setting means for setting a first image forming mode if the storage means has a small access speed, or setting a second image forming means if the storage means has a large access speed based on the deciding means;

selecting means for selecting one of the first and second image forming modes according to a decision by the deciding means; and image forming means for forming an image on the image forming medium based on the stored image information in the storage means in an image forming mode selected according to an output of the selecting means, wherein the image forming means comprises executing means for storing the image information of the original in the storage means after reading the image information by the read means and concurrently executing image formation of a first page in a normal condition or at restart after discontinuance of an operation.

28. An image forming apparatus comprising:

reading means for reading image information of an original;

storage means for storing the image information, which is comprised of a plurality of page images, read in the read means;

deciding means for deciding on whether an access speed of the storage means is small or large;

setting means for setting a first image forming mode if the access speed of the storage means is small, or setting a second image forming mode if the access speed of the storage means is large, based on the deciding means;

selecting means for selecting one of the first and second image forming modes set by the setting means according to a decision by the deciding means; and image forming means for forming a page image on an image forming medium from a page image included in the image information comprised of the plurality of page images stored in the storage means, in an image forming mode selected in accordance with an output of the selecting means, wherein the image forming means comprises deleting means for deleting page image information from the storage means each time when a page image is formed, if the first image forming mode is selected.

29. An image forming apparatus comprising:

scanner which reads image information of an original;

storage section which stores the image information read by the scanner;

deciding section which decides on whether an access speed of the storage section is small or large;

setting section which sets an image forming condition including a first sort mode if the access speed of the storage section is small, or a second sort mode if the access speed of the storage section is large, as a sort mode in which binding is carried out for each copy of the original in forming an image on an image forming medium from the image information stored in the storage section;

selecting section which selects one of the first and second sort modes set in the setting section according to an output signal of the generating section; and printer which forms an image on the image forming medium from the image forming stored in the storage section based on the image forming condition including a sort mode selected according to an output of the selecting section, wherein the printer comprises a deleting section which deletes page image information from the storage section each time when a page image is formed, if the first sort mode is selected.

30. An image forming apparatus comprising:

scanner which reads image information of an original;

storage section which stores the image information read by the scanner;

generating section which generates a signal showing whether the storage section has a large access speed or a small one;

setting section which sets an image forming condition including a first sort mode if the access speed of the storage section is small, or a second sort mode if the access speed of the storage section is large, as a sort mode in which binding is carried out for each copy of the original in forming an image on an image forming medium from the image information stored in the storage section;

selecting section which selects one of the first and second sort modes as a running state of an image forming condition set by the setting section according to an output of the generating section; and printer which forms an image on the image forming medium from the image information stored in the storage section based on the image forming condition including a sort mode selected according to an output of the selecting section.

31. An image forming apparatus comprising:

scanner which reads image information of an original;

storage section which stores the image information read by the scanner;

setting section which sets execution of image forming in either a group mode in which formation of an image on an image forming medium from the image information stored in the storage section is conducted so as to produce a predetermined number of copies for each page of the original or a sort mode in which formation of an image on an image forming medium from the image information stored in the storage section is conducted so as to carry out binding for each copy of the original;

first selecting section which selects, as a running state of image formation set in the setting mode, either the group mode or the sort mode;

second selecting section which selects, as a running state of the selected group mode according to an output of the first selecting section, either a first deletion mode in which the image information of each original page is deleted from the storage section each time when image formation of the predetermined number of copies for the original page is finished or a second deletion mode in which the image information of all the original pages is in a lump deleted from the storage section when image formation of the predetermined number of copies respectively for all the pages is finished; and deletion section which effects the deletion in a lump after the image formation is executed in the sort mode if the second deletion mode is selected.

32. An image forming apparatus comprising:

scanner which reads image information of an original;

storage section which stores the image information read by the scanner;

generating section which generates a type signal showing whether the storage section is of a first type which has a small storage capacity or of a second type which has a large capacity;

first detecting section which detects that an unused area of the storage section is equal to or less than a first threshold value if the storage section is of the first type based on the type signal;

second detecting section which detects that an unused area of the storage section is equal to or less than a second threshold value larger than the first threshold value if the storage section is of the second type based on the type signal;

effecting section which effects a memory-full operation on the storage section according to a detection signal from the first or second detecting section; and printer which forms an image on an image forming medium from the image information stored in the storage section.

33. An image forming apparatus comprising:

scanner which reads image information of an original;

compressing section which compresses the read image information;

storage section which stores the compressed image information in a file;

effecting section which effects a memory-full operation when a residual storage capacity of the storage section is at least equal to or less than a threshold value at which the image information, in which a page image of the maximum size readable by the scanner is compressed in a file, can be stored, and which effects the memory-full operation on the storage section when the memory-full occurs;

executing section which executes a read operation of the original, and compression of and file creation for the read image information of the original set on the scanner when the memory-full operation is effected; and printer which forms an image on an image forming medium based on the image information stored in a file in the storage section.

34. An image forming apparatus comprising:

scanner which reads image information of an original;

storage section which stores the image information read by the scanner;

first detecting section which detects whether or not a first storage device which has a large capacity and a small access speed as a storage section is included;

second detecting section which detects whether or not a second storage device which has a large access speed and a storage capacity equal to or more than a predetermined value is included;

control section comprising a concurrent operation control table which controls switching between a job in run and a following job and contents of the concurrent operations based on a detection result of the first and second detecting sections; and running section which runs a predetermined job under control by the control section.

35. An image forming apparatus comprising:

scanner which reads image information of an original;

storage section which stores the image information read by the scanner;

detecting section which detects mounting a large capacity storage apparatus which has a small access speed as the storage section;

setting section which sets a self-diagnostic mode of the large capacity storage apparatus when power is applied;

securing section which secures a volume of a predetermined quantity in the interior of the large capacity storage apparatus if a specific command is given in a condition set in a self-diagnostic mode;

volume storage section which stores the image information in the volume; and printer which forms an image on the image forming medium based on the image information stored in the volume under a predetermined image forming condition.

36. An image forming apparatus comprising:

scanner which reads image information of an original;

storage section which stores the image information read by the scanner;

first file creating section which creates a file in a compressed condition for the image information stored in the storage section;

second file creating section which creates a file for the image information stored in the storage section in a condition of being compressed and rotated by 90 degrees;

third file creating section which creates a file for the image information stored in the storage section in a condition of being compressed and rotated by 180 degrees;

fourth file creating section which creates a file for the image information stored in the storage section in a condition of being compressed and rotated by 270 degrees; and printer which forms an image on the image forming medium based on the image information stored in a file under a predetermined image forming condition.

37. An image forming apparatus comprising:

scanner which reads image information of an original;

storage section which stores the image information read by the scanner;

deciding section which decides whether an access speed of the storage section is small or large;

setting section which sets a first image forming mode if the storage section has a small access speed, or sets a second image forming mode if the storage section has a large access speed based on the deciding section;

selecting section which selects one of the first and second image forming modes according to a decision by the deciding section; and printer which forms an image on the image forming medium based on the stored image information in the storage section in an image forming mode selected according to an output of the selecting section, wherein the printer comprises an executing section which stores the image information of the original in the storage section after reading the image information by the scanner and concurrently executes image formation of a first page in a normal condition or at restart after discontinuance of an operation.

38. An image forming apparatus comprising:

scanner which reads image information of an original;

storage section which stores the image information, which is comprised of a plurality of page images, read in the scanner;

deciding section which decides whether an access speed of the storage section is small or large;

setting section which sets a first image forming mode if the access speed of the storage section is small, or sets a second image forming mode if the access speed of the storage section is large, based on the deciding section;

selecting section which selects one of the first and second image forming modes set by the setting section according to a decision by the deciding section; and printer which forms a page image on an image forming medium from a page image included in the image information comprised of the plurality of page images stored in the storage section, in an image forming mode selected in accordance with an output of the selecting section, wherein the printer comprises a deleting section which deletes page image information from the storage section each time when a page image is formed, if the first image forming mode is selected.

* * * * *